US010822082B2

(12) United States Patent
Hanna et al.

(10) Patent No.: US 10,822,082 B2
(45) Date of Patent: Nov. 3, 2020

(54) DISTRIBUTED-BATTERY AERIAL VEHICLE AND A POWERING METHOD THEREFOR

(71) Applicants: Mark Holbrook Hanna, Medicine Hat (CA); Douglas Morgan Hanna, Medicine Hat (CA)

(72) Inventors: Mark Holbrook Hanna, Medicine Hat (CA); Douglas Morgan Hanna, Medicine Hat (CA)

(*) Notice: Subject to any disclaimer, the term of this patent is extended or adjusted under 35 U.S.C. 154(b) by 321 days.

(21) Appl. No.: 15/922,326

(22) Filed: Mar. 15, 2018

(65) Prior Publication Data
US 2018/0290746 A1    Oct. 11, 2018

Related U.S. Application Data

(60) Provisional application No. 62/483,180, filed on Apr. 7, 2017.

(51) Int. Cl.
*B64C 39/02* (2006.01)
*H02J 1/10* (2006.01)
(Continued)

(52) U.S. Cl.
CPC .............. *B64C 39/024* (2013.01); *H02J 1/10* (2013.01); *H02J 7/007* (2013.01); *H02J 7/14* (2013.01);
(Continued)

(58) Field of Classification Search
CPC ........ B64C 2201/042; B64C 2201/027; B64C 2201/108
See application file for complete search history.

(56) References Cited

U.S. PATENT DOCUMENTS 8,434,710 B2    5/2013   Hothi et al.
8,880,241 B2   11/2014   Mohamadi
(Continued)

FOREIGN PATENT DOCUMENTS

CN    205311892 U    6/2016
CN    205469859      8/2016
(Continued)

OTHER PUBLICATIONS

International Search Report and Written Opinion dated Jun. 5, 2018 issued in parallel PCT App. No. PCT/CA2018/050252 (9 pages).

*Primary Examiner* — Philip J Bonzell
*Assistant Examiner* — Tye William Abell
(74) *Attorney, Agent, or Firm* — Sterne, Kessler, Goldstein & Fox P.L.L.C.

(57) ABSTRACT

A battery-powered aerial vehicle has a central controller, one or more propelling modules, and one or more battery assemblies for powering at least the one or more propelling modules. The battery assemblies are at a distance away from the central controller for reducing electromagnetic interference to the central controller. In some embodiments, the aerial vehicle is an unmanned aerial vehicle (UAV) having a center unit, a plurality of rotor units circumferentially uniformly distributed about and coupled to the center unit, and one or more battery assemblies. The central controller is in the center unit and the propelling modules are in respective rotor units. Each battery assembly is in a rotor unit in proximity with the propelling module thereof. In some embodiments, the central controller also has a battery-power balancing circuit for balancing the power consumption rates of the one or more battery assemblies.

18 Claims, 17 Drawing Sheets

(51) Int. Cl.
*H02J 7/00* (2006.01)
*H02J 7/14* (2006.01)

(52) U.S. Cl.
CPC ....... *B64C 2201/042* (2013.01); *H02J 7/0014* (2013.01); *Y02T 10/70* (2013.01)

(56) References Cited

U.S. PATENT DOCUMENTS

| | | | |
|---|---|---|---|
| 9,016,617 | B2 | 4/2015 | Wang et al. |
| 9,221,536 | B2 | 12/2015 | Wang et al. |
| 9,221,537 | B2 | 12/2015 | Wang et al. |
| 9,233,754 | B1 | 1/2016 | Wang et al. |
| 9,284,049 | B1 | 3/2016 | Wang et al. |
| 9,321,530 | B2 | 4/2016 | Wang et al. |
| 9,394,048 | B2 | 7/2016 | Wang et al. |
| 9,469,394 | B2 | 10/2016 | Vaughn et al. |
| 9,475,579 | B2 | 10/2016 | Fredericks et al. |
| 9,550,561 | B1 | 1/2017 | Beckman et al. |
| 9,908,618 | B2 | 3/2018 | Vaughn et al. |
| 10,099,783 | B1 | 10/2018 | Nilson |
| 10,207,794 | B1 | 2/2019 | Beckman et al. |
| 2014/0131510 | A1 | 5/2014 | Wang et al. |
| 2015/0158392 | A1 | 6/2015 | Zhao |
| 2016/0122018 | A1* | 5/2016 | Matsue ................ G05D 1/0858 244/17.13 |
| 2016/0129998 | A1 | 5/2016 | Welsh et al. |
| 2016/0229530 | A1 | 8/2016 | Welsh et al. |
| 2017/0021915 | A1 | 1/2017 | Vaughn et al. |
| 2017/0144771 | A1* | 5/2017 | Lukaczyk ............. B64C 39/024 |
| 2018/0155024 | A1 | 6/2018 | Lee et al. |
| 2018/0273194 | A1* | 9/2018 | Edgar .................... B64D 27/24 |
| 2018/0327090 | A1* | 11/2018 | De Chassey .......... B64C 39/024 |
| 2019/0179344 | A1 | 6/2019 | Qu et al. |
| 2019/0258139 | A1 | 8/2019 | Overall et al. |
| 2019/0260191 | A1* | 8/2019 | Lavoie ................. B64C 39/024 |
| 2019/0276140 | A1 | 9/2019 | Poltorak |
| 2019/0375510 | A1 | 12/2019 | Qiu et al. |

FOREIGN PATENT DOCUMENTS

| | | |
|---|---|---|
| CN | 106314776 A | 1/2017 |
| CN | 205931245 U | 2/2017 |
| CN | 106828897 | 6/2017 |
| CN | 105752340 B | 9/2017 |
| CN | 108521774 A | 9/2018 |
| CN | 108706096 A | 10/2018 |
| CN | 109367806 A | 2/2019 |
| CN | 109398710 A | 3/2019 |
| CN | 109934871 A | 6/2019 |
| CN | 110171562 A | 8/2019 |
| CN | 209454973 U | 10/2019 |
| CN | 110678390 A | 1/2020 |
| WO | WO 2018/030651 A1 | 2/2018 |
| WO | WO 2018/032425 A1 | 2/2018 |
| WO | WO 2019/028871 A1 | 2/2019 |
| WO | WO 2019/143014 A1 | 7/2019 |
| WO | WO 2020/012996 A1 | 1/2020 |

* cited by examiner

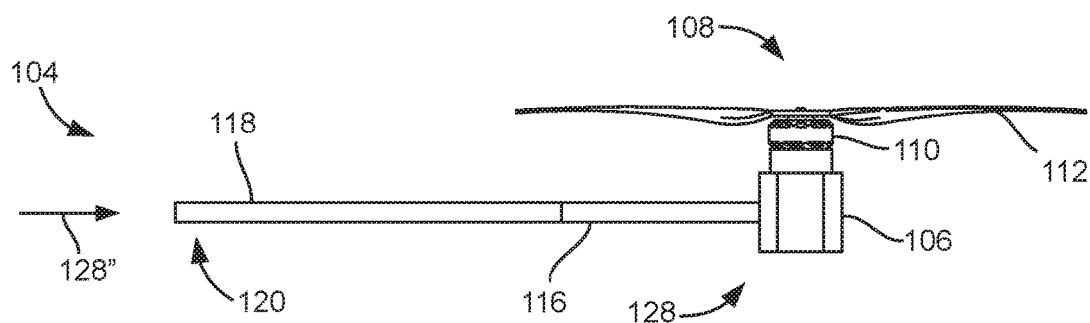
FIG. 13A
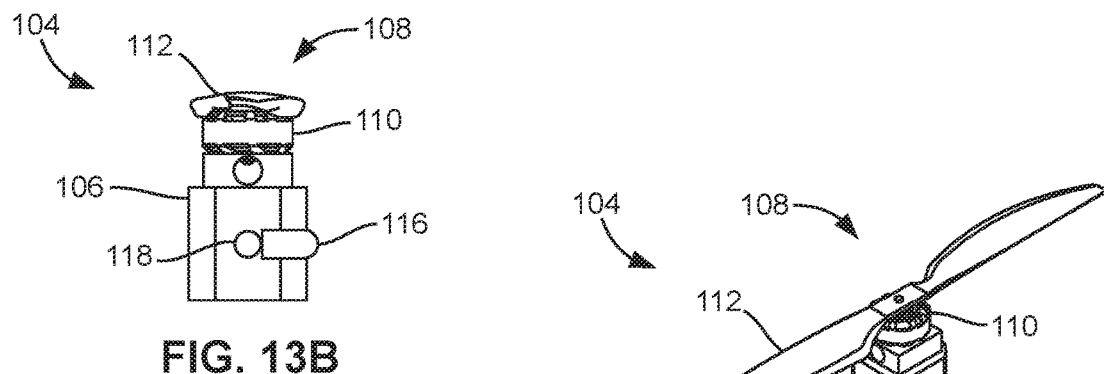
FIG. 13B
FIG. 13C
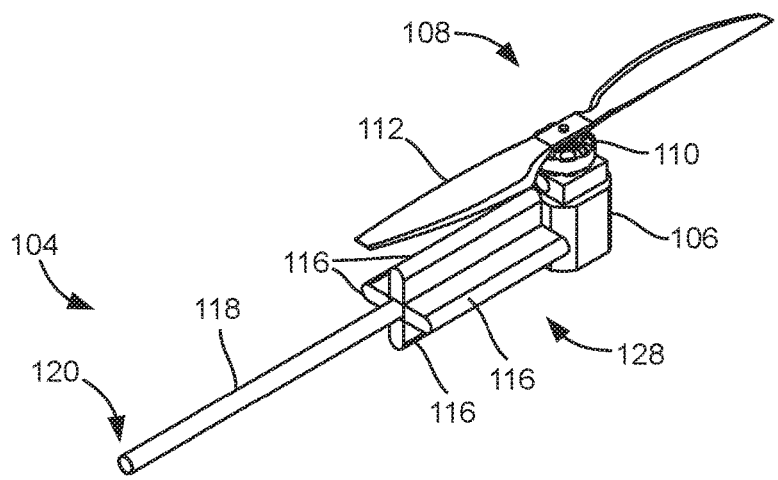
FIG. 14A

DISTRIBUTED-BATTERY AERIAL VEHICLE AND A POWERING METHOD THEREFOR

CROSS-REFERENCE TO RELATED APPLICATIONS

This application claims the benefit of US Provisional Patent Application Ser. No. 62/483,180 filed Apr. 7, 2017, the content of which is incorporated herein by reference in its entirety.

FIELD OF THE DISCLOSURE

The present disclosure relates generally to battery-powered aerial vehicles, and in particular to battery-powered unmanned aerial vehicles (UAVs) having distributed batteries, and a UAV-powering method employing same.

BACKGROUND

Unmanned aerial vehicles (UAVs) or drones are known. A UAV generally comprises a flight structure received therein or thereon an energy source for driving an engine to flight and a central controller for controlling the engine and other components of the UAV. A UAV may be operated by a remote operator via a remote control in communication with the central controller, and/or operated automatically or autonomously by a pilot program on the UAV or remote thereto.

UAVs may be powered by various energy sources such as batteries, solar panels, and/or fuels (for example, gas, diesel, and the like). In prior-art battery-powered UAVs, the batteries thereof are usually rechargeable Lithium-ion polymer batteries (also called "Lithium polymer (Li-Po) batteries"). While Li-Po batteries are of light weight, they generally occupy a substantive space in the UAV, provide limited flight time, and require long recharging time.

In prior-art battery-powered UAVs, the batteries thereof are usually arranged near the central controller, and may cause interferences to components thereof. Such interference may occur during preflight calibrations and/or flight thereby preventing proper operation of the UAV or causing a critical UAV failure such as a crash during flight.

For example, it has been observed that batteries at high discharge rates may cause magnetic interference to magnetometer which is a component often in or used by the central controller. As another example, while metal-clad batteries have the advantages of high energy density and thus high energy storage capacity, they may cause significant magnetic interference to the nearby central controller and therefore, have not gained use in prior-art UAVs.

SUMMARY

According to one aspect of this disclosure, there is disclosed a battery-powered aerial vehicle such as an unmanned aerial vehicle (UAV). The battery-powered aerial vehicle comprises a center unit, a plurality of rotor units circumferentially uniformly distributed about and coupled to the center unit, and one or more battery assemblies. The center unit comprises a central controller. Each rotor unit comprises a propeller, a motor coupled to and driving the propeller, and an electrical speed-controller (ESC) module electrically coupled to the motor for controlling the speed of the motor. The one or more battery assemblies power at least the motors and the ESC module, and may also power the central controller. Each of the one or more battery assemblies is located in a rotor unit in proximity with the motor thereof.

Therefore, the one or more battery assemblies are at a distance away from the central controller. Interferences that the one or more battery assemblies may otherwise cause to the central controller are significantly reduced.

According to one aspect of this disclosure, there is disclosed a battery-powered aerial vehicle comprising a body; a central controller received in the body; at least one propelling module received in the body and functionally coupled to the central controller each of the at least one propelling module comprising a base structure; and one or more battery assemblies coupled to or received in the body.

The one or more battery assemblies being configured for at least powering the at least one propelling module, and the one or more battery assemblies are at a distance away from the central controller for reducing electromagnetic interference to the central controller.

In some embodiments, at least one of the one or more battery assemblies comprises one or more metal-clad battery cells.

In some embodiments, the central controller is in proximity with at least one of the at least one propelling module.

In some embodiments, each of the one or more battery assemblies is in proximity with one of the at least one propelling module; and the central controller is at the distance away from the at least one propelling module.

In some embodiments, the central controller comprises a battery-power balancing circuit for balancing the power consumption rates of the one or more battery assemblies.

In some embodiments, each of the at least one propelling module comprises an electrical motor coupled to the base structure, a propeller rotatably coupled to the electrical motor, and an electrical speed-controller coupled to the base structure and electrically coupled to the electrical motor for controlling the speed thereof.

In some embodiments, the base structure comprises a chamber for receiving therein the electrical speed-controller.

In some embodiments, the body comprises a center unit receiving therein the central controller, and a plurality of rotor units circumferentially uniformly distributed about and coupled to the center unit; and each of the at least one propelling module is received in one of the plurality of rotor units.

In some embodiments, the base structure is coupled to the central controller via a coupling component.

In some embodiments, the coupling component is a supporting arm.

In some embodiments, at least a portion of the rotor units each comprises a supporting leg; and each of the one or more battery assemblies extends between two of the supporting legs.

In some embodiments, the battery-powered aerial vehicle comprises a plurality of the propelling modules; and each of the one or more battery assemblies extends between two of the base structures.

In some embodiments, the battery assembly is received in the base structure.

In some embodiments, the battery assembly extends horizontally from the base structure.

In some embodiments, the battery assembly extends horizontally from the base structure towards the center unit.

In some embodiments, the battery assembly comprises a first and a second battery unit. The first battery units extend horizontally from the base structure away from the center unit, and the second battery units extends horizontally from the base structure towards the center unit.

In some embodiments, the one or more battery assemblies are coupled to the base structure of the at least one propelling module.

In some embodiments, the battery assembly extends upwardly from the base structure.

In some embodiments, the battery assembly extends downwardly from the base structure.

In some embodiments, the battery assembly comprises at an end thereof two pairs of ridges; and the base structure comprises two pairs of grooves for receiving therein the two pairs of ridges for coupling the battery assembly to the base structure.

In some embodiments, the electrical speed-controller comprises a first, a second, and a third sets of electrical terminals. The first set of electrical terminals are configured for contacting a fourth set of electrical terminals of the battery assembly for receiving power therefrom, the second set of electrical terminals are configured for contacting a fifth set of electrical terminals of the base structure that electrically coupled to the electrical motor for powering the electrical motor and communicating therewith, and the third set of electrical terminals are configured for contacting a sixth set of electrical terminals of the base structure that electrically coupled to the central controller for communicating with the central controller.

In some embodiments, the battery assembly extends downwardly from the coupling component.

In some embodiments, the battery assembly is further configured for acting as a supporting leg.

In some embodiments, the battery assembly is received in the coupling component.

In some embodiments, the battery assembly extends horizontally from the base structure and above the coupling component.

In some embodiments, the battery assembly extends horizontally from the base structure and below the coupling component.

In some embodiments, the battery assembly extends horizontally from the base structure along a lateral side of the coupling component.

In some embodiments, the battery assembly extends horizontally from the base structure and circumferentially about the coupling component.

In some embodiments, the body comprises at least two wing sections and a fuselage receiving therein the at least one propelling module; the one or more battery assemblies are received in the at least two wing sections; and the central controller is received in the fuselage.

In some embodiments, the body comprises at least two wing sections and a fuselage receiving therein about a first end thereof the at least one propelling module; the one or more battery assemblies are received in the fuselage in proximity to the at least one propelling module; and the central controller is received in the fuselage about a second end thereof at the distance away from the one or more battery assemblies.

In some embodiments, the one or more battery assemblies are also received in the at least two wing sections.

In some embodiments, the body comprises at least two fuselages, a connection section coupling the at least two fuselages, and at least two wing sections; the one or more battery assemblies are received in the at least two fuselages; and the central controller is received in the connection section.

In some embodiments, the body comprises at least two fuselages, a connection section coupling the at least two fuselages, and at least two wing sections; the one or more battery assemblies are received in the at least two wing sections; and the central controller is received in the connection section.

In some embodiments, the body comprises at least two fuselages, a connection section coupling the at least two fuselages, and at least two wing sections; the one or more battery assemblies are received in the at least two wing sections and the at least two fuselages; and the central controller is received in the connection section.

According to one aspect of this disclosure, there is disclosed a battery-powered aerial vehicle comprising: a center unit comprising a central controller; a plurality of rotor units circumferentially uniformly distributed about and coupled to the center unit, each rotor unit comprising a propeller, an electrical motor coupled to and driving the propeller, and an electrical speed-controller electrically coupled to the motor for controlling the speed thereof; and one or more battery assemblies for powering at least the motors and the electrical speed-controllers. Each of the one or more battery assemblies is located in a rotor unit in proximity with the motor thereof.

In some embodiments, at least one of the one or more battery assemblies comprises one or more metal-clad battery cells.

In some embodiments, the central controller comprises a battery-power balancing circuit for balancing the power consumption rates of the one or more battery assemblies.

According to one aspect of this disclosure, there is disclosed a battery-powered aerial vehicle comprising: at least one motor, each of the at least one motor rotatably coupled to and driving a propeller; at least one electrical speed controller, each of the at least one electrical speed controller electrically coupled to one of the at least one motor for controlling the speed thereof; a central controller electrically coupled to the at least one electrical speed controller for controlling the at least one electrical speed controller to adjust the speed of the at least one motor; and one or more battery assemblies for powering at least the motors and the electrical speed controllers. The one or more battery assemblies are at a distance away from the central controller.

According to one aspect of this disclosure, there is disclosed a part for coupling to a center unit of a battery-powered aerial vehicle, said center unit comprising a central controller. The part comprises a propeller; an electrical motor coupled to and driving the propeller; an electrical speed-controller electrically coupled to the motor for controlling the speed thereof; and a battery assembly for powering at least the motor and the electrical speed-controller.

In some embodiments, the part further comprises a base structure receiving therein the electrical speed-controller and coupled to the battery assembly and the electrical motor, the base structure being configured for coupling to the central controller of the center unit.

In some embodiments, the part further comprises a coupling component for coupling the base structure to the central controller of the center unit.

According to one aspect of this disclosure, there is disclosed a method of assembling a battery-powered aerial vehicle. The method comprises preparing a center unit having a central controller; preparing a plurality of rotor units each having a propeller, an electrical motor coupled to and driving the propeller, and an electrical speed-controller electrically coupled to the motor for controlling the speed thereof; physically and electrically coupling a battery assembly to each rotor unit for powering at least the motor and the electrical speed-controller thereof; and physically and electrically coupling each rotor unit to the center unit.

In some embodiments, said preparing the plurality of rotor units comprises, for each rotor unit, preparing a base structure having a first mounting surface, a second mounting surface, a chamber, and a first engagement structure on a third mounting surface; coupling an electrical motor assembly onto the first mounting surface of the base structure, the electrical motor assembly comprising an electrical motor coupled to a propeller; receiving an electrical speed-controller in the chamber of the base structure; preparing a battery assembly having a second engagement structure engagable with the first engagement structure; and engaging the first and second engagement structures to couple the battery assembly to the base structure.

In some embodiments, said first engagement structure comprises at least two pairs of grooves, and said second engagement structure comprises at least two pairs of ridges; and said engaging the first and second engagement structures comprises engaging the at least two pairs of grooves with the at least two pairs of ridges, respectively.

In some embodiments, said physically and electrically coupling each rotor unit to the center unit comprises coupling a first end of a supporting arm to the second mounting surface of the base structure of the rotor unit; and coupling a second end of the supporting arm to the center unit.

BRIEF DESCRIPTION OF THE DRAWINGS

FIGS. 3A to 3H show the base structure of the rotor unit shown in FIG. 2A, wherein FIG. 3A is a perspective view of the base structure, viewing from a first viewing angle, FIG. 3B is a perspective view of the base structure, viewing from a second viewing angle, FIGS. 3C to 3G are front, rear, plan, bottom, and side views of the base structure, respectively, and FIG. 3H is a schematic cross-sectional view of the base structure;

FIGS. 4A to 4E show the housing of the battery assembly of the rotor unit shown in FIG. 2A, wherein FIG. 4A is a perspective view of the battery housing, viewing from a first viewing angle, FIG. 4B is a perspective view of the battery housing, viewing from a second viewing angle, FIGS. 4C and 4D are side and front views of the battery housing, respectively, and FIG. 4E is a schematic cross-sectional view of the battery housing;

FIGS. 12A to 14E show various configurations of the battery assembly in some alternative embodiments;

DETAILED DESCRIPTION

Figure 1:
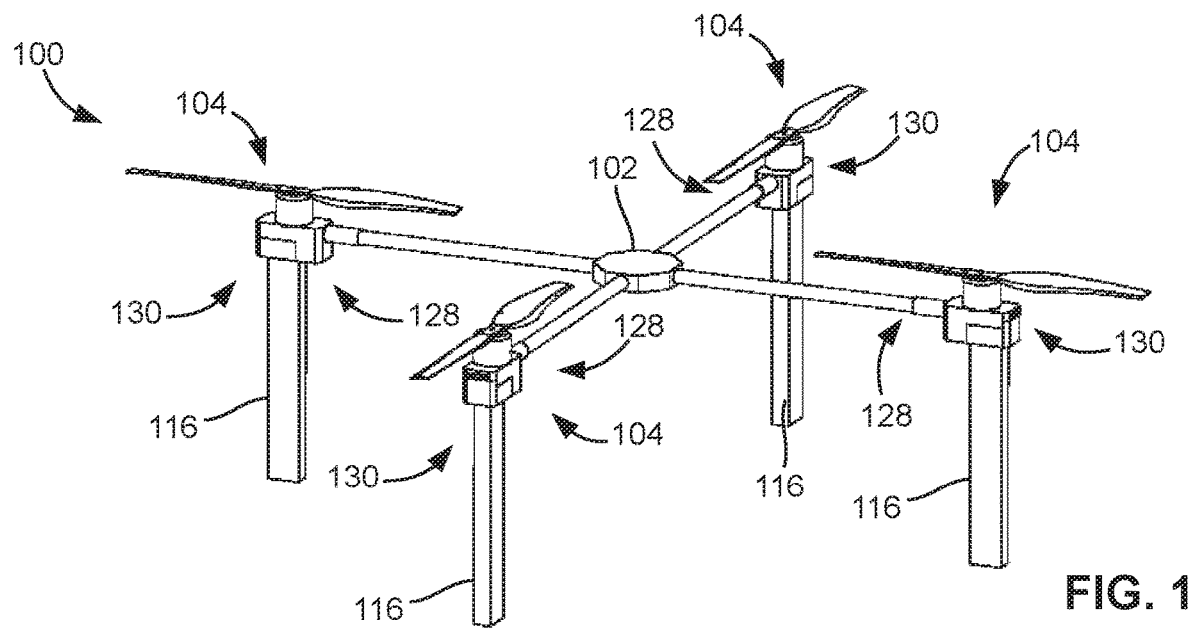
FIG. 1 is a perspective view of a multiple-rotor UAV having a center unit and four rotor units, according to some embodiments of this disclosure.

The embodiments of the present disclosure generally relate to battery-powered aerial vehicles such as a battery-powered unmanned aerial vehicle (UAV). The aerial vehicle comprises a propelling module for flight, a central controller for controlling the propelling module, and one or more battery assemblies such as metal-clad high-energy-density battery assemblies and/or Li-Po batteries for powering the propelling module and the central controller, although in some embodiments the central controller may have its own power source. Each battery assembly may comprise one or more battery cells. The aerial vehicle may be operated by a remote operator via a remote control in communication with the central controller, and/or operated automatically or autonomously by a pilot program on the aerial vehicle or remote thereto.

In various embodiments, the one or more battery assemblies are at a distance away from the central controller for reducing or eliminating electromagnetic interference to the central controller and the components thereof such as magnetometer.

In some embodiments, the aerial vehicle is a battery-powered UAV having a distributed battery pack and at least one electronic speed-controller (ESC) module. The distributed battery pack comprises one or more battery assemblies located away from the UAV center controller with distances sufficient for reducing or eliminating electromagnetic interference to components thereof.

In some embodiments, the UAV is a battery-powered, multiple-axial or multiple-rotor UAV such as quadcopter (i.e., drones having four rotors), hexacopter (i.e., drones having six rotors), octocopter (i.e., drones having eight rotors), and the like, wherein the UAV has a plurality of rotors rotatably coupled to a rotor blade or propeller. The multiple-rotor UAV also comprises a plurality of electrical motors each driving a rotor. A metal-clad high-energy-density battery assembly of the distributed battery pack is arranged adjacent (e.g., underneath) each rotor, and mechanically and electrically coupled thereto for powering the rotor.

In some embodiments, each battery assembly of the distributed battery pack is located in proximity with a motor and has a capacity sufficient for providing the required power to that motor.

In some embodiments wherein the UAV comprises a plurality of supporting arms. Each supporting arm supports a motor at a distal end thereof, wherein each battery assembly is located about the distal end of a respective supporting arm, such as coupled to the motor or coupled to the supporting arm about the distal end thereof, for powering the motor.

In some embodiments, each battery assembly may also act as a supporting leg or as a part of the supporting leg.

In some embodiments wherein each motor is mounted on a base structure, each battery assembly is also coupled to a respective base structure. Of course, those skilled in the art will appreciate that in some embodiments, the locations of the battery assemblies may be a combination of the locations described herein. For example, some battery assemblies may be located underneath respective motors as supporting legs, and some other battery assemblies may be located in supporting arms.

In some embodiments, each ESC module is located near a respective motor and is electrically coupled to a respective battery assembly and the respective motor for powering the motor and controlling the speed thereof thereby resulting in much shorter electrical wiring between the battery and the ESC modules compared to that in conventional UAVs in which the ESC modules are located distant from the battery. These short electrical wirings between the battery assembly and the ESC modules reduce the electrical noise and variation otherwise caused by the wirings during dynamic motor speed variations, thereby reducing the probability of ESC-module failure.

Those skilled in the art will appreciate that battery drain may not be even across all battery assemblies due to uneven loads placed on motors. In some embodiments, battery-power balancing is used for balancing the power consumption of each battery assembly, and for maximizing the life of the battery assemblies. In some embodiments, passive balancing may be used. In some other embodiments, active balancing may be used. In yet some other embodiments, a battery management system (BMS) may be used. Depending on the implementation, the BMS may comprise active balancing, temperature monitoring, charging, and other suitable battery management functions.

Turning to FIG. 1, a battery-powered aerial vehicle is shown and is generally identified using reference numeral 100. In these embodiments, the battery-powered aerial vehicle 100 is a multiple-rotor, battery-powered UAV and comprises a body which may be partitioned into a plurality of parts including a center unit 102 and a plurality of rotor units 104. For example, in the example shown in FIG. 1, the multiple-rotor UAV 100 is a so-called quadcopter having a center unit 102 and four generally identical rotor units 104.

Figure 2A:
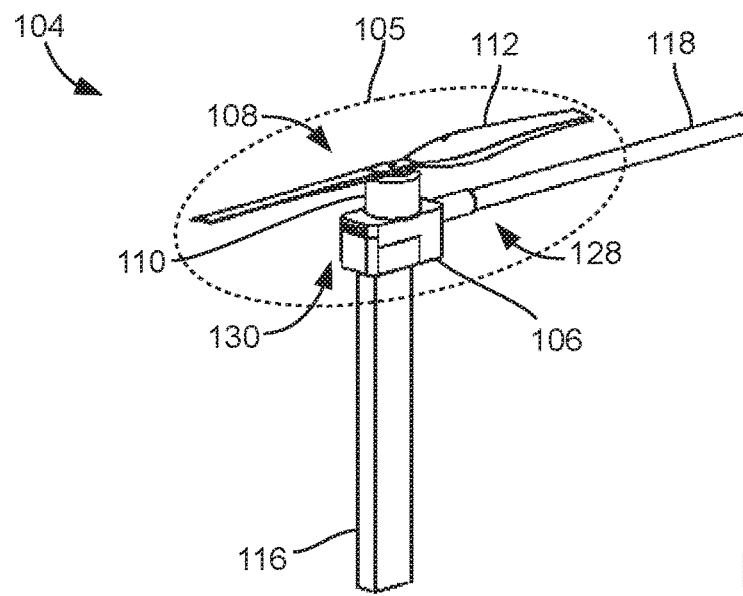
FIG. 2A is a perspective view of a rotor unit of the multiple-rotor UAV shown in FIG. 1.
Figure 2B:
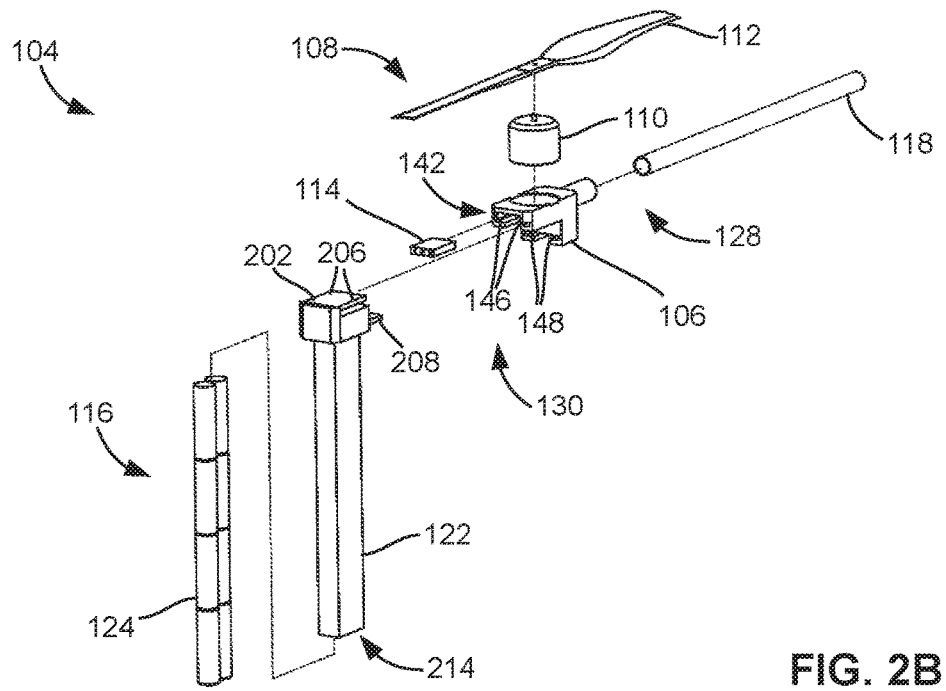
FIG. 2B is a perspective exploded view of the rotor unit shown in FIG. 2A.

FIGS. 2A and 2B show one of the rotor units 104. As shown, the rotor unit 104 comprises an electrically-powered propelling module 105 coupled to the center unit 102 via a coupling component 118 such as a supporting arm, and a battery assembly 116 physically and electrically coupled to the propelling module 105 for providing electrical power thereto. The propelling module 105 comprises a base structure 106 as a mounting base for receiving and mounting a rotor assembly 108 and an ESC module 114. The base structure 106 is also coupled to the supporting arm 118 for mounting the propelling module 105 to the center unit 102. In these embodiments, the coupling component 118 is a cylindrical supporting arm.

The rotor assembly 108 comprises an electrical motor 110 and a propeller or blade 112 driven by the electrical motor 110. The ESC module 114 is electrically coupled to the electrical motor 110 for controlling the speed thereof.

The battery assembly 116 comprises a battery pod or housing 122 and one or more high-energy-density battery cells 124 received in the battery housing 122 for providing electrical power to the ESC module 114 and the electrical motor 110. The battery cells 124 may be any suitable battery cells such as metal-clad batteries, Lithium-ion batteries, Lithium-ion polymer (Li-Po) batteries, and the like. For example, in some embodiments, metal-clad batteries that use clad metals as connectors are used for their high-energy storage volumes and small sizes.

FIGS. 3A to 3H show the detail of the base structure 106. As shown, the base structure 106 comprises an "L"-shaped main body 132 which comprises a circular recess 136 on a top surface 140 thereof for receiving a motor 110 of a rotor assembly 108. The base structure 106 also comprises an arm connector 134 extending from a rear surface 138 of the main body 132 on a proximal or rear side 128 thereof for coupling to the supporting arm 118. Herein, the term "proximal" refers to a side or end towards the center unit 102, and the term "distal" refers to a side or end opposite to the proximal side or end and away from the center unit 102 (see FIGS. 1 to 3B and FIGS. 3E to 3G).

On the distal or front side 130, the main body 132 comprises a slot extending inwardly from a front surface 144 into the main body 132 and forming a chamber 142 with a front-side opening for receiving the ESC module 114. The main body 132 also comprises a pair of upper channels or grooves 146 and a pair of lower channels or grooves 148 for sliding in and coupling the battery assembly 116.

Figure 3A:
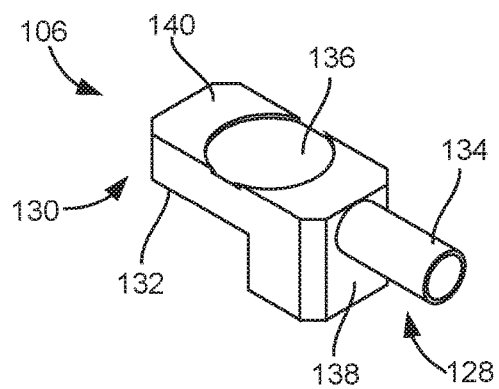
Figure 3B:
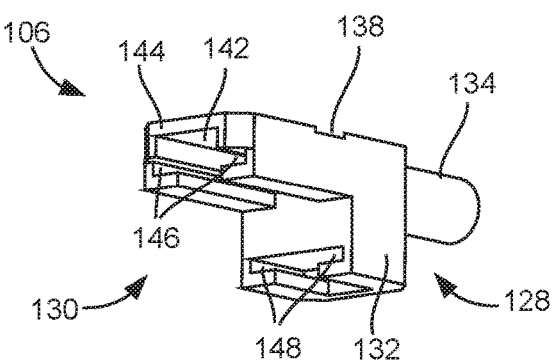
Figure 3C:
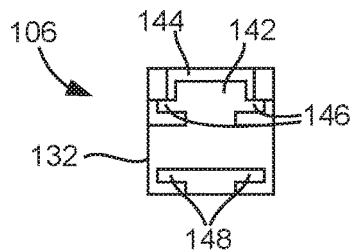
Figure 3D:
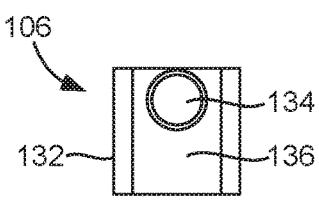
Figure 3E:
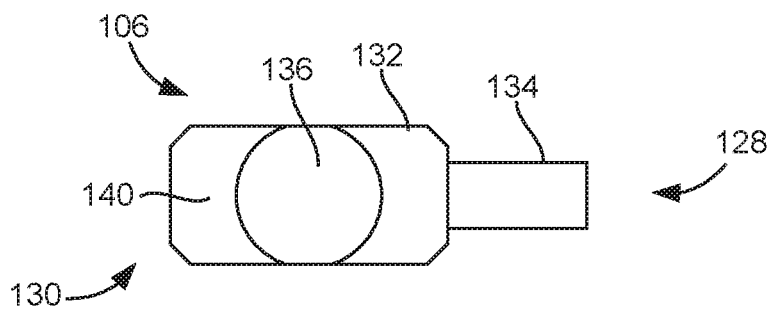
Figure 3F:
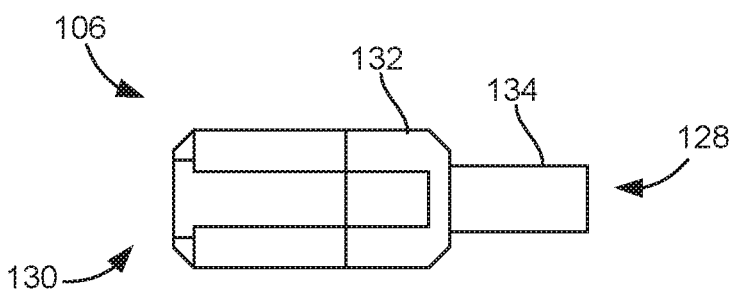
Figure 3G:
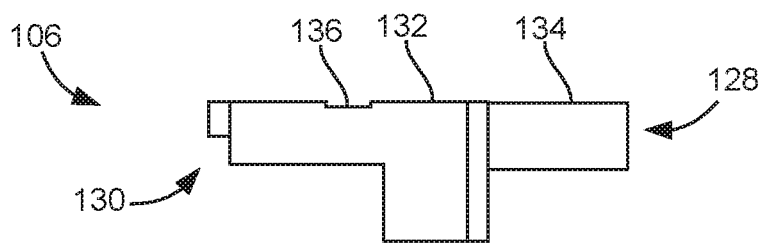
Figure 3H:
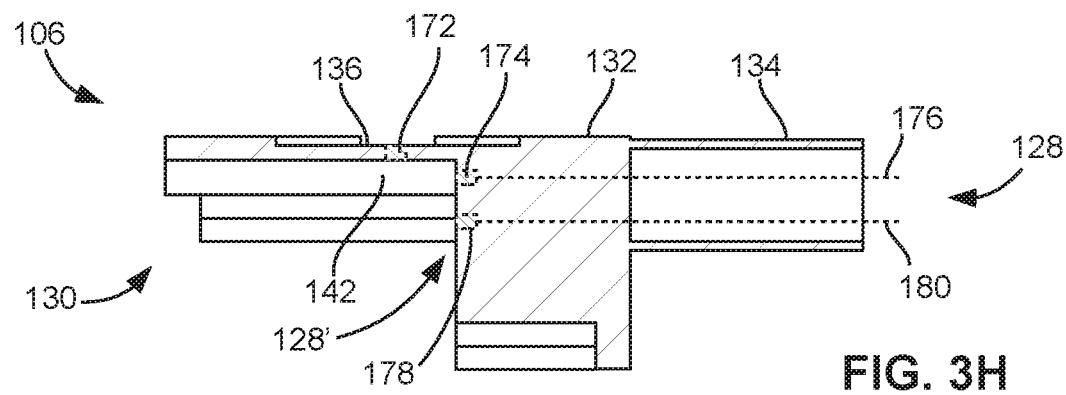

FIG. 3H is a schematic cross-sectional view of the base structure 106. As shown, the main body 132 of the base structure 106 comprises three sets of electrical contact terminals 172, 174 and 178 about the chamber 142.

Figure 5:
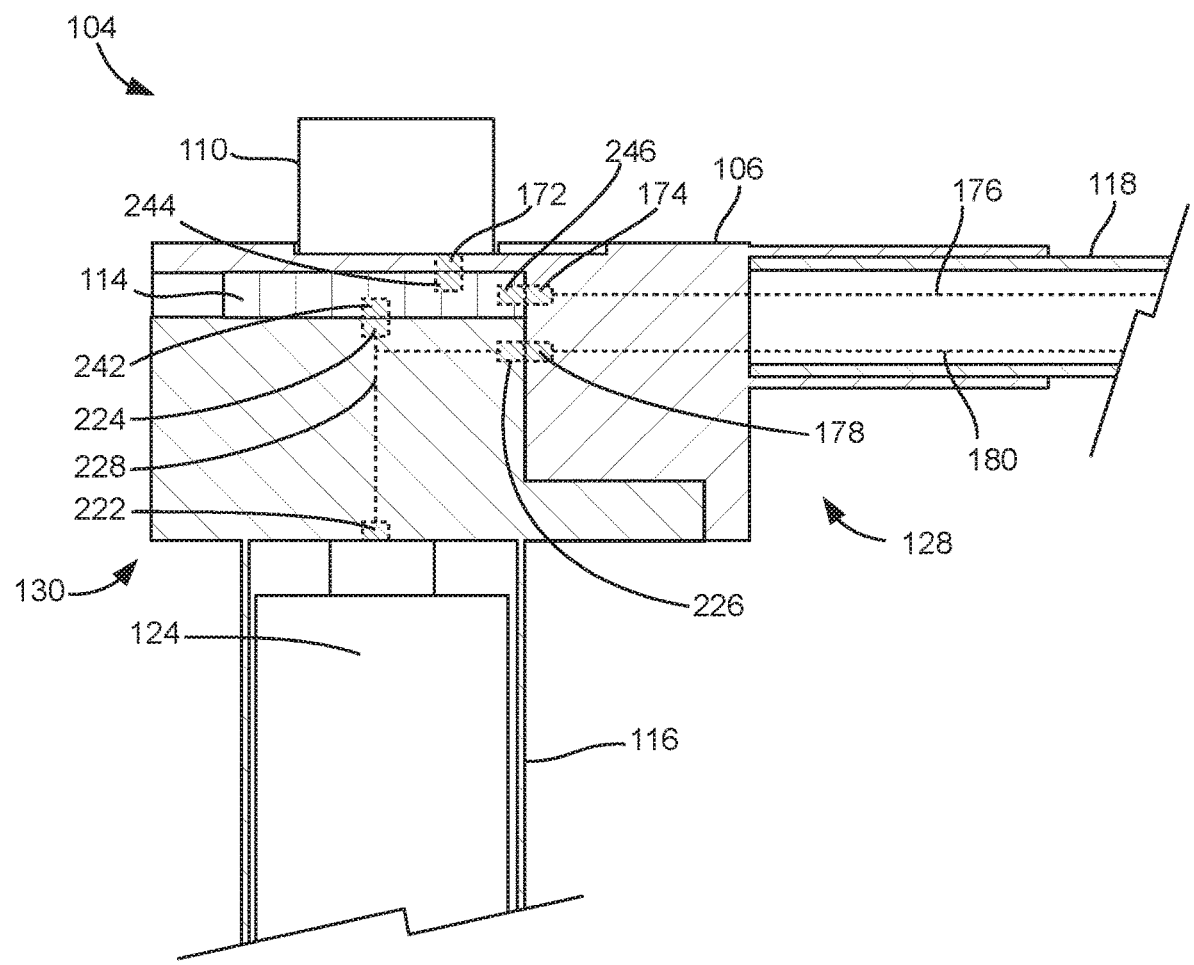
FIG. 5 is a schematic cross-section view of a portion of the rotor unit shown in FIG. 2A, illustrating the electrical connections thereof.

The first set of electrical contact terminals 172 extends from the circular recess 136 into the chamber 142 for electrically coupling the corresponding electrical terminals of the motor 110 to be located thereabove (not shown in FIG. 3H; see FIG. 5) to the corresponding electrical terminals of the ESC module 114 to be located therebelow (not shown in FIG. 3H; see FIG. 5). Thus, the first set of electrical contact terminals 172 is configured for electrically coupling the motor 110 to the ESC module 114.

The second set of electrical contact terminals 174 is located at a proximal end 128' of the chamber 142 for electrically coupling to corresponding electrical terminals of the ESC module 114 (not shown in FIG. 3H; see FIG. 5). The second set of electrical contact terminals 174 is also electrically coupled to a set of conductive wires 176 which extends through the arm connector 134 and the supporting arm 118 (not shown in FIG. 3H; see FIG. 5) to the center unit 102 and is electrically coupled to a flight control module 304 of a central controller 302 therein (see FIGS. 6 and 7, described in more detail later). Thus, the second set of electrical contact terminals 174 and the wires 176 are configured for electrically coupling the ESC module 114 to the central controller 302 in the center unit 102.

The third set of electrical terminals 178 is located in proximity with the proximal ends 128' of the upper channels 146 for electrically coupling to corresponding electrical terminals of the battery assembly 116 (not shown in FIG. 3H; see FIG. 5). The third set of electrical contact terminals 178 is also electrically coupled to a set of conductive wires 180 which extends through the arm connector 134 and the supporting arm 118 (not shown in FIG. 3H; see FIG. 5) to the center unit 102 and is electrically coupled to a balance board 306 of the central controller 302 therein (see FIGS. 6 and 7, described in more detail later). Thus, the third set of electrical contact terminals 178 and the wires 180 are configured for electrically coupling the battery assembly 116 to the central controller 302 in the center unit 102.

FIGS. 4A to 4E show the battery housing 122 of the battery assembly 116. In this embodiment, the battery housing comprises a rigid material such as steel, rigid plastic, and the like. The battery housing 122 comprises a head portion 202 and a main body 204. The head portion 202 comprises a pair of upper tracks or ridges 206 matching the upper channels 146 of the base structure 106, and a pair of lower tracks or ridges 208 matching the lower channels 148 thereof. The main body 204 of the battery housing 122 has a hollow chamber 212 and a removable bottom wall 214 for receiving one or more battery cells 124. In another embodiment, the battery housing 122 comprises a fixed bottom wall 214 and a removable head portion 202.

Figure 4A:
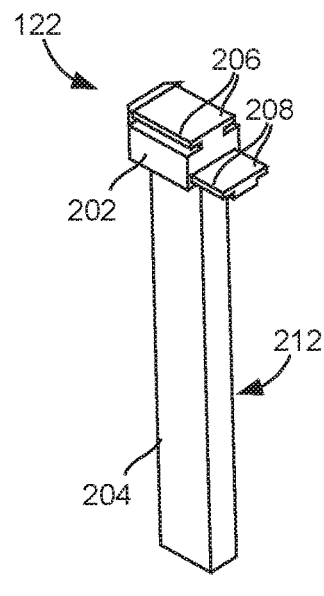
Figure 4B:
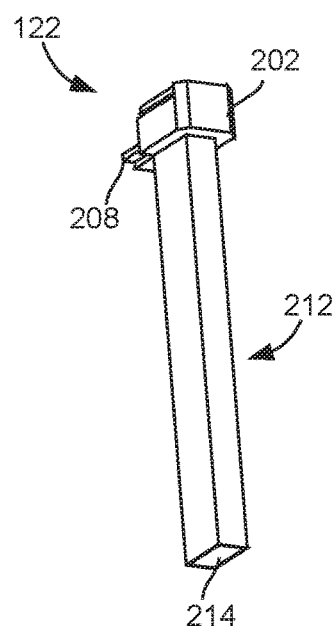
Figure 4C:
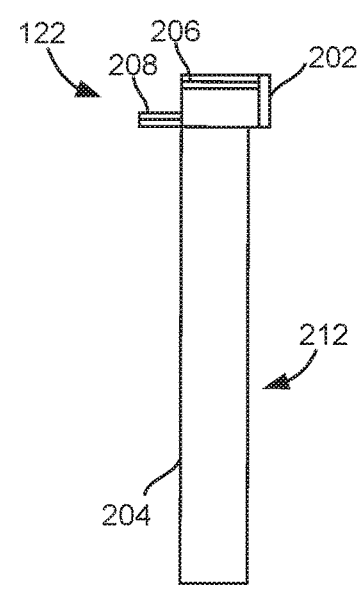
Figure 4D:
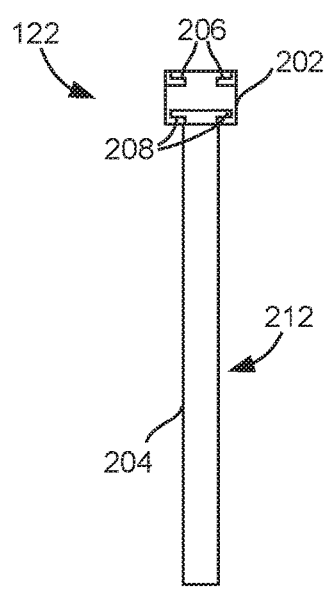
Figure 4E:
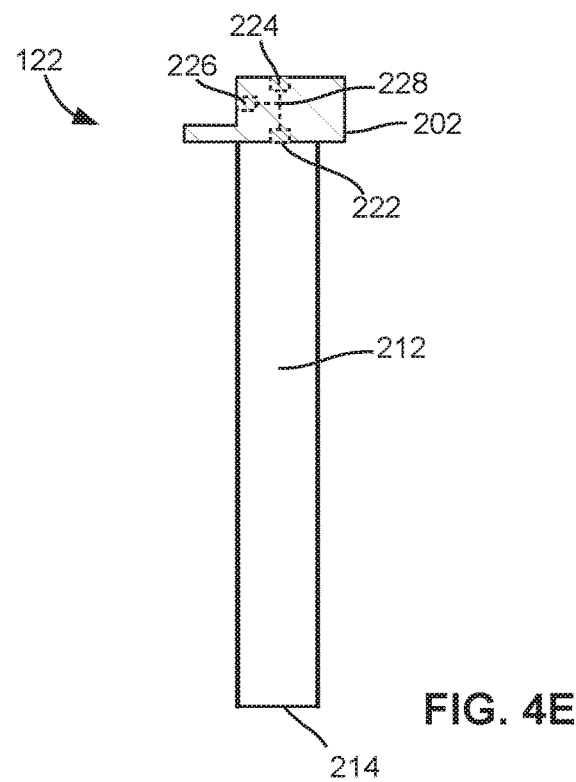

FIG. 4E is a schematic cross-sectional view of the battery housing 122. As shown, the head portion 202 of the battery housing 122 comprises three sets of electrical contact terminals 222, 224, and 226 electrically interconnected with each other via suitable wiring 228.

The first set of electrical contact terminals 222 is configured for electrically coupling to the battery cells in the chamber 212 thereof. The second set of electrical contact terminals 224 is configured for electrically coupling to the ESC module 114 to be located thereabove. The third set of electrical contact terminals 226 is configured for electrically coupling to the third set of electrical terminals 178 in the base structure 106.

Referring again to FIG. 2B, to assemble the UAV 100, the propeller 112 is coupled to a shaft of the electrical motor 110 which is mounted onto the base structure 106 by suitable fastening means such as screws, nails, glue, and the like. An ESC module 114 is slid into the chamber 142 of the base structure 106.

To assemble the battery assembly 116, a set of battery cells 124 is inserted into the battery housing 122 via the removable bottom wall 214 thereof. The assembled battery assembly 116 is then coupled to the base structure 106 by sliding the head portion 202 of the battery housing 122 into the base structure 106 and engaging the tracks 206 and 208 of the head portion 202 with channels 146 and 148, respectively. After the motor 110, the ESC module 114, and the battery assembly 116 are mounted to the base structure 106, they are also electrically interconnected. Then, the supporting arm 118 is coupled to the arm connector 134 of the base structure 106 and the wirings 176 and 180 are extended through the supporting arm 118 for connecting to the center unit 102. A rotor unit 104 is thus assembled.

After assembling a required number of rotor units 104, such as the four rotor units 104 in the example shown in FIG. 1, each assembled rotor unit 104 is coupled to the center unit 102 by electrically coupling the wirings 176 and 180 to respective electrical connectors (not shown) of the center unit 102, and then mounting the supporting arms 108 to the center unit 102. The UAV 100 is then assembled. As shown in FIG. 1, in addition to providing electrical power to various components, the battery assemblies 116 may also act as supporting legs.

FIG. 5 is a schematic cross-section view of a portion of the rotor unit 104 with the motor 110, the ESC module 114, the battery assembly 116 mounting to the base structure 106, for illustrating the electrical connections thereof. As shown, the ESC module 114 comprises three sets of electrical terminals 242, 244, and 246 for receiving power from of the battery assembly 116, powering and communicating with the electrical motor 110, and communicating with the central controller 302, respectively.

The first set of electrical terminals 242 is located on a bottom wall of the ESC module 114 and is in electrical contact with the second set of electrical terminals 224 of the battery assembly 116 which is subsequently electrically coupled to the battery cells 124.

The second set of electrical terminals 244 is located on a top wall of the ESC module 114 and is in electrical contact with the first set of electrical terminals 172 of the base structure 106 which is subsequently electrically coupled to corresponding electrical terminals (not shown) of the electrical motor 110.

The third set of electrical terminals 246 is located on a rear wall thereof and is in electrical contact with the second set of electrical terminals 174 of the base structure 106 which, as described above, is subsequently electrically coupled to the central controller 302 in the center unit 102 via conductive wiring 176.

The first set of electrical terminals 222 of the battery assembly 116 is electrically coupled to the battery cells 124. The second set of electrical terminals 224 of the battery assembly 116 is electrically coupled to the electrical terminals 242 of the ESC module 114. The third set of electrical terminals 226 of the battery assembly 116 is electrically coupled to the third set of electrical terminals 178 of the base structure 106 which, as described above, is subsequently electrically coupled to the central controller 302 in the center unit 102 via conductive wiring 180.

In this manner, the battery assembly 116 powers the electrical motor 110 via the ESC module 114, and powers the central controller 302 (see FIGS. 6 and 7) in the center unit 102 via the wire 180. The central controller 302 in the center unit 102 communicates with the ESC module 114 via the wire 176 for adjusting the operation of the electrical motor 110.

In this embodiment, each rotor unit 104 comprises a motor 110, an ESC module 114, and a battery assembly 116. The battery assembly 116 is located in proximity with the corresponding ESC module 114 with short electrical wiring therebetween which reduces the electrical noise and variation during dynamic motor speed variations.

Moreover, each battery assembly 116 is located about a distal end of the corresponding supporting arm 118 and thus is at a distance away from the central controller of the center unit 102. Compared to conventional UAVs of a similar size, the distance between the battery assemblies 116 and the electrical components in the center unit 102 is significantly increased. Consequently, the interferences to the electrical components in the center unit 102 caused by the battery assemblies 116 are significantly reduced or even practically eliminated.

Figure 6:
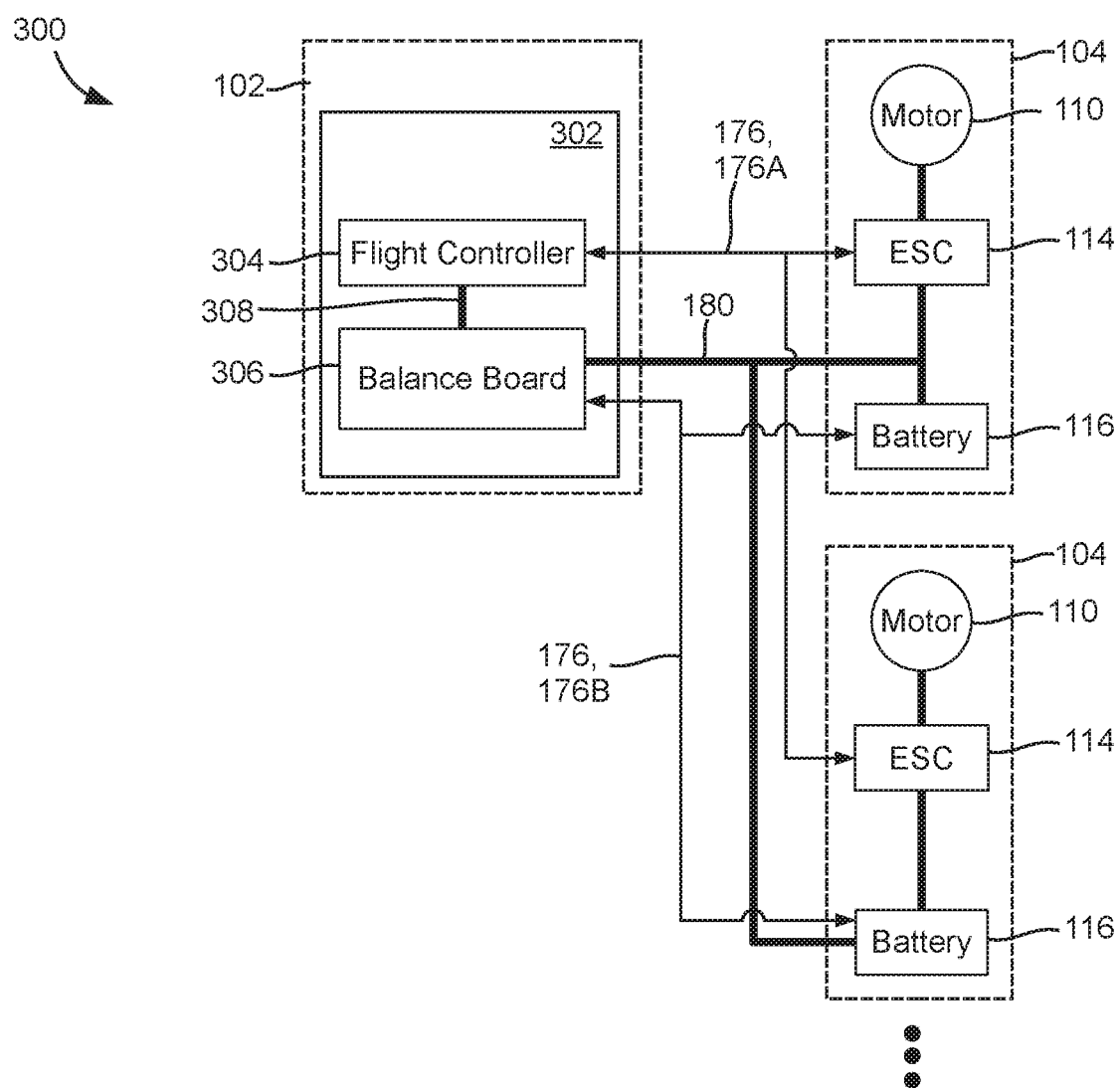
FIG. 6 is a schematic electrical diagram of the UAV shown in FIG. 1.

The UAV 100 in this embodiment provides distributed battery power and electrical speed-control with battery-power balancing. FIG. 6 is a schematic electrical diagram 300 of the UAV 100, wherein lines 180 and 308 with a thicker width represent power wires, and lines 176 (including lines 176A and 176B) with a narrower width represents signal wires.

As shown, the motor 110, ESC module 114, and battery assembly 116 of each rotor unit 104 are electrically coupled to a central controller 302 in the center unit 102.

The center unit 102 comprises a central controller 302 having a plurality of electrical components such as a flight control module 304, a power balancing board 306, a Radio Frequency (RF) transceiver (not shown), a Global Positioning System (GPS) receiver (not shown), and other necessary components (not shown) such as an inertial measurement unit (IMU) having accelerometer and gyroscope, a barometer, a magnetometer, a video camera, a microphone, and the like, all electrically interconnected as needed or via an electrical bus (not shown).

The flight control module 304 is powered by the battery assemblies 116 of the rotor units 104 via the power wires 180 between the battery assemblies 116 and the power balancing board 306, and the power wire 308 between the power balancing board 306 and the flight control module 304. The flight control module 304 collects flight-relevant data from sensors such as the IMU, barometer, magnetometer, and the like, to determine the flight status of the UAV 100, and adjusts the propellers 112 accordingly. In particular, the flight control module 304 controls the ESC module 114 in each rotor unit 104 via signal wire 176A, to adjust the speed of each motor 110 to individually control the speed of the corresponding propeller 112.

The flight control module 304 also communicates with a remote controller (not shown) via the RF transceiver to receive user commands from the remote controller for controlling the flight of the UAV 100 as commanded by the user.

The power balancing board 306 monitors the power consumption of each battery assembly 116 and individually and dynamically adjusts the power output thereof via signal wire 176B such that all battery assemblies 116 may have a similar power consumption rate.

In this embodiment, all battery assemblies 116 are interconnected in parallel in the power balancing board 306. Therefore, the battery assemblies 116 having higher energy storage will charge those having lower energy storage. Consequently, all battery assemblies 116 achieve a same power consumption rate.

Figure 7:
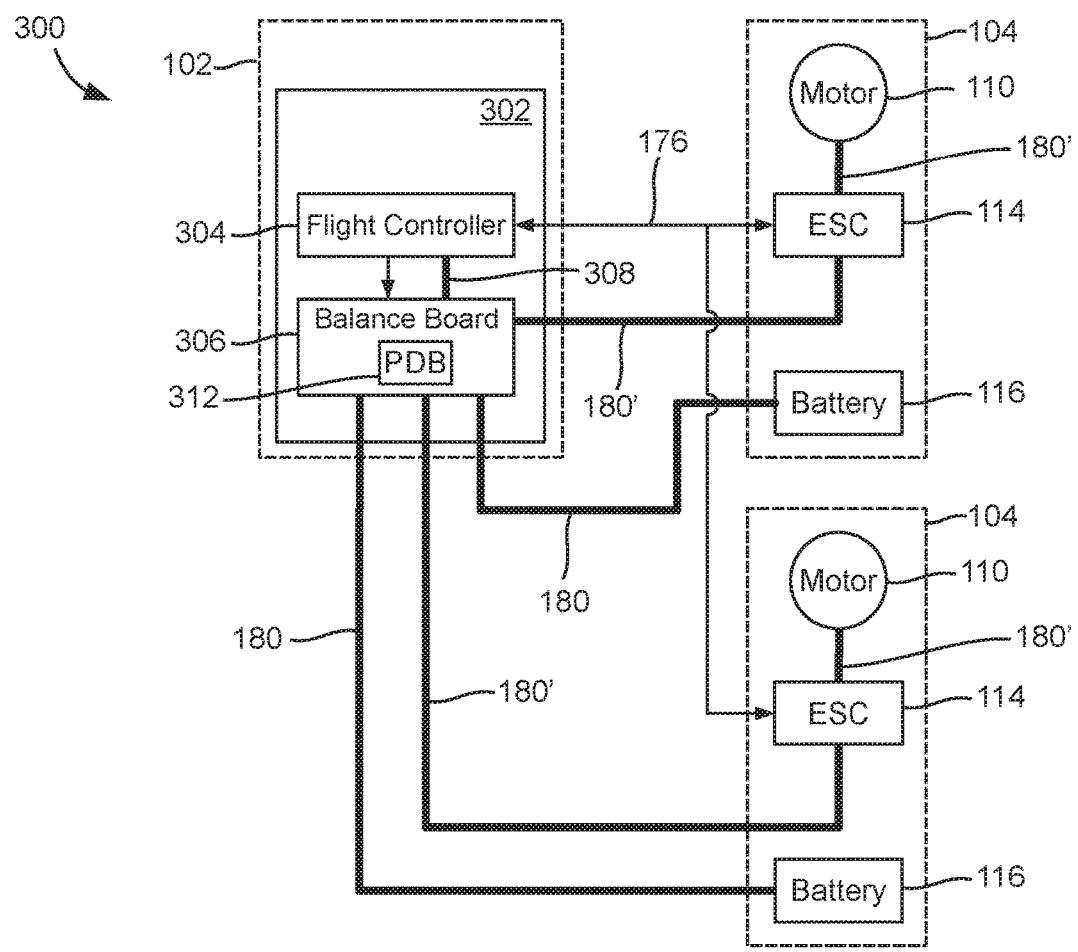
FIG. 7 is a schematic electrical diagram of the UAV shown in FIG. 1, according to some alternative embodiments of this disclosure.

In another embodiment as shown in FIG. 7, all battery assemblies 116 are electrically coupled to the power balancing board 306 via power wires 180, and the power balancing board 306 distributes electrical power from the battery assemblies 116 to each ESC module 114 and motor 110 via power wires 180'.

The power balancing board 306 in this embodiment monitors the power consumption of each battery assembly 116 and uses a power distribution board (PDB) 312 to dynamically adjust the power distribution. Consequently, the motor 110 experiencing heavy load may be powered by more than one battery assembly 116. On the other hand, a battery assembly 116 with high remaining energy storage may have high power drain rate (e.g., powering the motor 110 with heavy load, and/or powering more than one motors 110) until its remaining energy storage is about the same as that of other battery assemblies 116. Alternatively, the power balancing board 306 may monitor the power consumption of each battery assembly 116, and use battery assemblies 116 having higher energy storage to charge those battery assemblies 116 having lower energy storage. The power balancing board 306 may also monitor the charging of the battery assemblies 116 to prevent overheat and/or overcharging.

In an alternative embodiment, each battery assembly 116 powers its respective motor 110 via the ESC module 114 in the same rotor unit 104 and via a passive power balancing circuit such as an adjustable resistor (not shown). The power balancing board 306 monitors the power consumption of each battery assembly 116 and dynamically adjusts the resistance of the adjustable resistor such that all battery assemblies 116 have the same load. A disadvantage of this method is that the power consumed by the adjustable resistors is wasted as heat.

Figure 8:
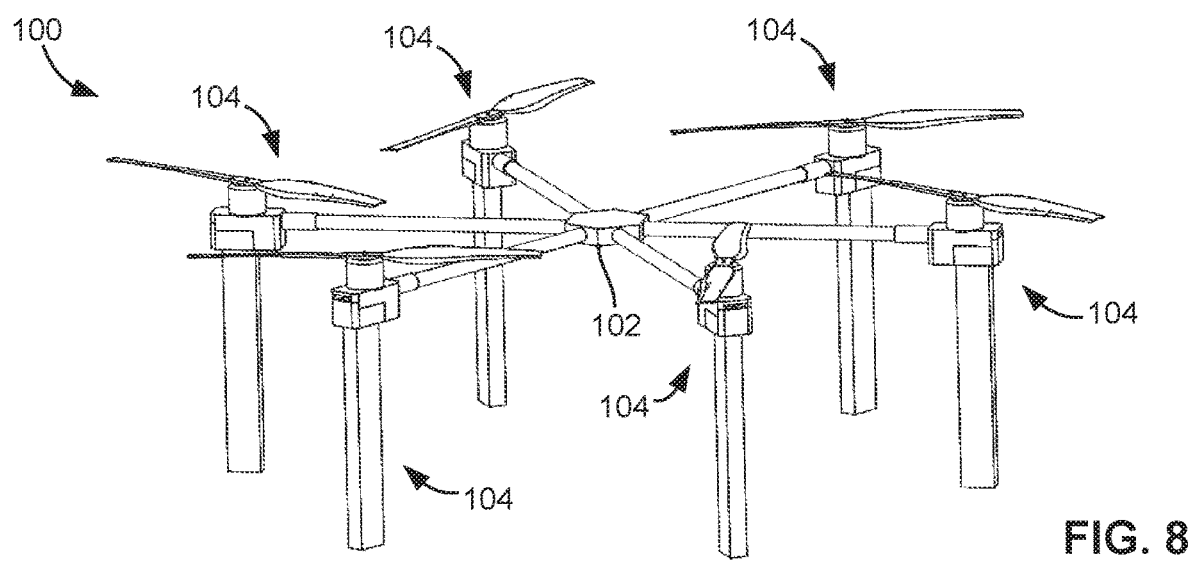
FIG. 8 is a perspective view of a multiple-rotor UAV according to yet some alternative embodiments of this disclosure, wherein the UAV comprises a center unit and six rotor units.

FIG. 8 shows a UAV 100 in an alternative embodiment. The UAV 100 in this embodiment is a so-called "hexacopter" and is similar to that shown in FIGS. 1 to 6 except that the UAV 100 in this embodiment comprises a center unit 102 and six (6) rotor units 104.

Figure 9:
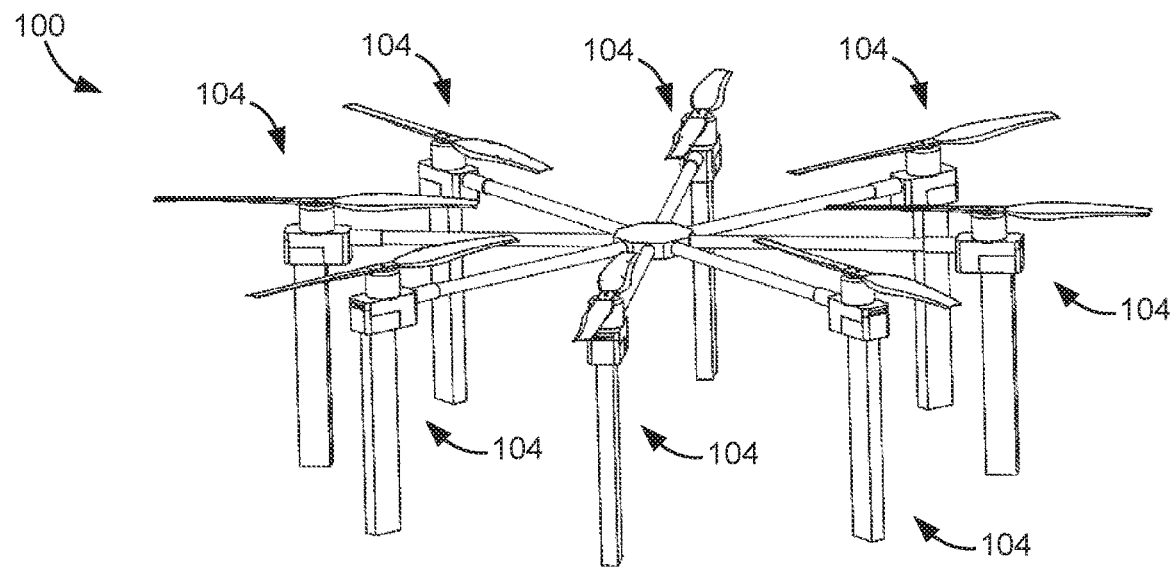
FIG. 9 is a perspective view of a multiple-rotor UAV according to still some alternative embodiments of this disclosure, wherein the UAV comprises a center unit and eight rotor units.

FIG. 9 shows a UAV 100 in another embodiment. The UAV 100 in this embodiment is a so-called "octocopter" and is similar to that shown in FIGS. 1 to 6 except that the UAV 100 in this embodiment comprises a center unit 102 and eight (8) rotor units 104.

In above embodiments, each rotor unit 104 comprises a battery assembly 116. The UAV 100 in these embodiments has the advantage of generally uniform weight distribution. In some alternative embodiments, some rotor units 104 may not comprise any battery assemblies.

Figure 10:
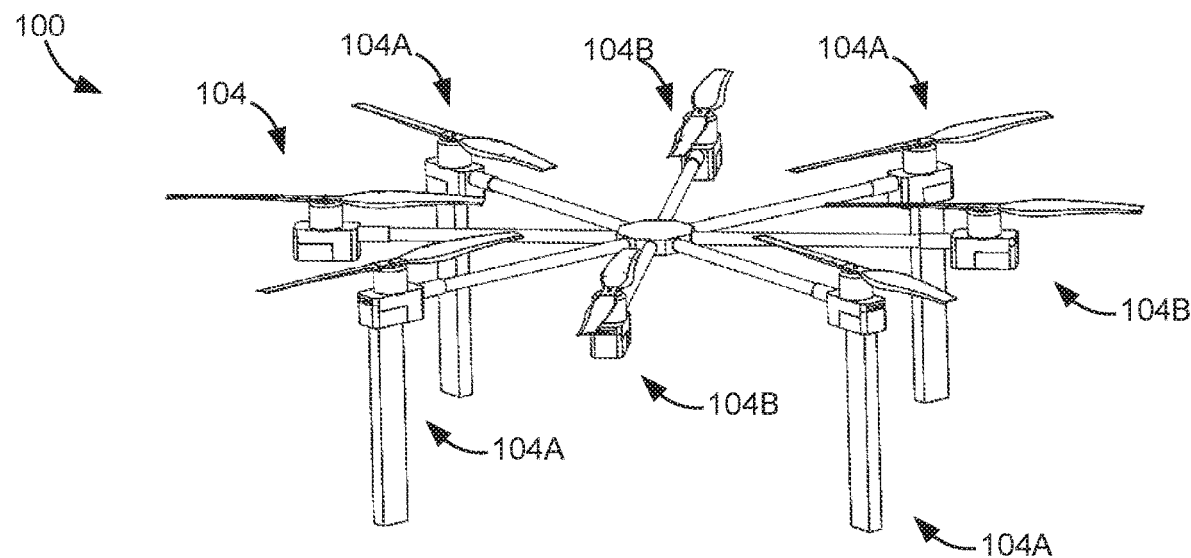
FIG. 10 is a perspective view of a multiple-rotor UAV according to some alternative embodiments of this disclosure, wherein the UAV comprises a center unit, four rotor units with battery assembly, and four rotor units without battery assembly.

For example, in one embodiment as shown in FIG. 10, an octocopter 100 comprises four rotor units 104A each having a battery assembly 116 and four rotor units 104B with no battery assembly, wherein the eight rotor units 104A and 104B are circumferentially uniformly arranged about a center unit 102. Each rotor unit 104A with battery assembly is circumferentially intermediate a pair of adjacent rotor units 104B without battery assembly.

Figure 11A:
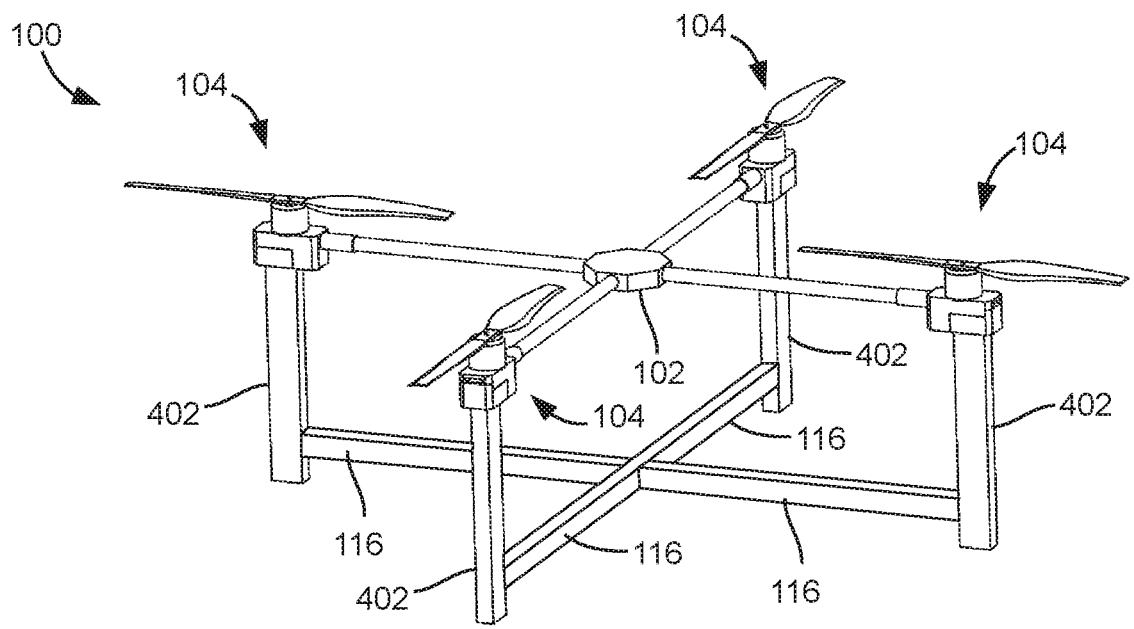
FIG. 11A is a perspective view of a multiple-rotor UAV according to some alternative embodiments of this disclosure, wherein the UAV comprises a center unit, four rotor units each having a supporting leg, and four battery assemblies as crossbars between the supporting legs.

In above embodiments, each battery assembly 116 is also used as a supporting leg. In some embodiments as shown in FIG. 11A, each rotor unit 104 of the UAV 100 comprises a supporting leg 402. The battery assemblies 116 are coupled to the supporting legs 402 as horizontal crossbars.

Figure 11B:
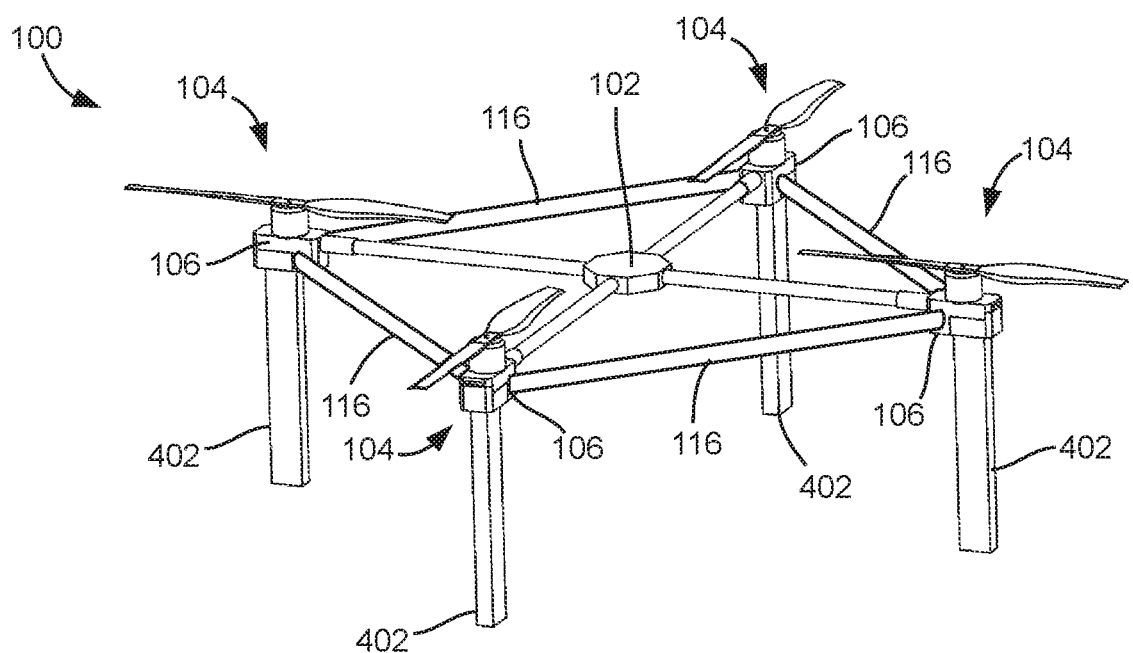
FIG. 11B is a perspective view of a multiple-rotor UAV according to some alternative embodiments of this disclosure, wherein the UAV comprises a center unit, four rotor units each having a supporting leg, and four battery assemblies as crossbars between base structures of the rotor units.

In some embodiments as shown in FIG. 11B, each rotor unit 104 of the UAV 100 comprises a supporting leg 402. The battery assemblies 116 are coupled to the base structures 106 of the rotor units 104 as horizontal crossbars.

In above embodiments, the central controller 302 is powered by the battery assemblies 104. In some alternative embodiments, the central controller 302 comprises its own battery or a suitable power source, and does not require any power from the battery assemblies 104.

In above embodiments, the battery assemblies 116 are in a vertical orientation when assembled to the UAV 100. In some alternative embodiments, some or all battery assemblies 116 may be in an angled orientation (i.e., the angle thereof with respect to a horizontal plane, is not 90°) when assembled. In some alternative embodiments, some or all battery assemblies 116 may be in a horizontal orientation when assembled.

Figure 12A:
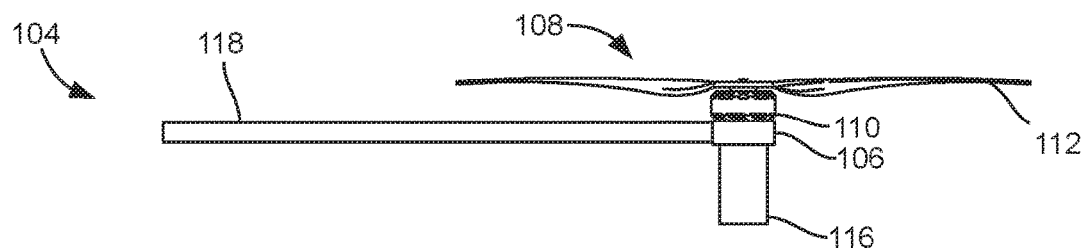

FIGS. 12A to 14E show various configurations of the battery assembly 116 in some alternative embodiments. In one embodiment as shown in FIG. 12A, the rotor unit 104 is similar to that shown in FIG. 2A wherein the battery assembly 116 of a rotor unit 104 extends downwardly from the base structure 106. However, in this embodiment, the battery assembly 116 has a short length and is not configured for acting as a supporting leg. The UAV 100 in this embodiment comprises separate supporting legs (not shown).

Figure 12B:
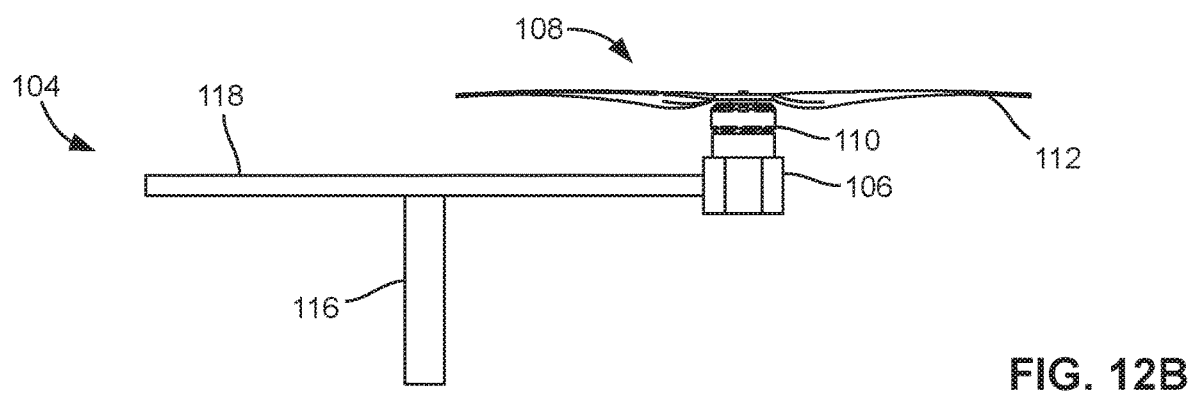

In one embodiment as shown in FIG. 12B, the battery assembly 116 of a rotor unit 104 extends downwardly from the supporting arm 118 at a location spaced from or in proximity with the base structure 106 and the rotor assembly 108 with a sufficient distance away from the center unit (not shown). In this embodiment, the battery assembly 116 is also configured for acting as a supporting leg.

Figure 12C:
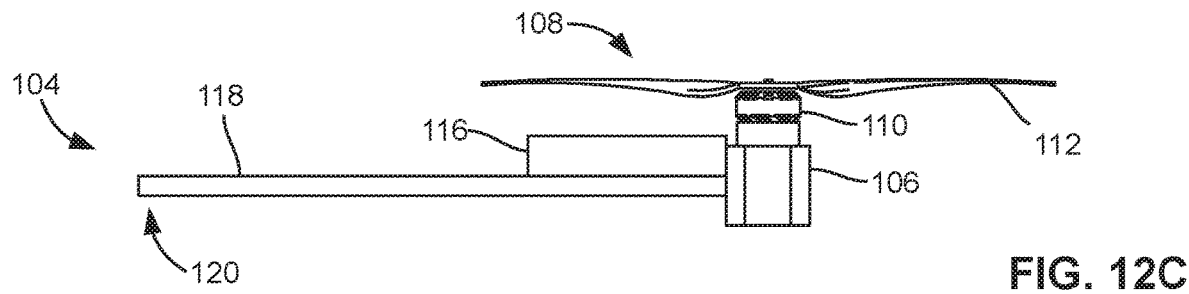

In one embodiment as shown in FIG. 12C, the battery assembly 116 of a rotor unit 104 extends horizontally backwardly from the base structure 106 towards a proximal end 120 of the rotor unit 104 and is coupled to the top of the supporting arm 118 using suitable fastening means such as screw, glue, welding, and/or the like.

Figure 12D:
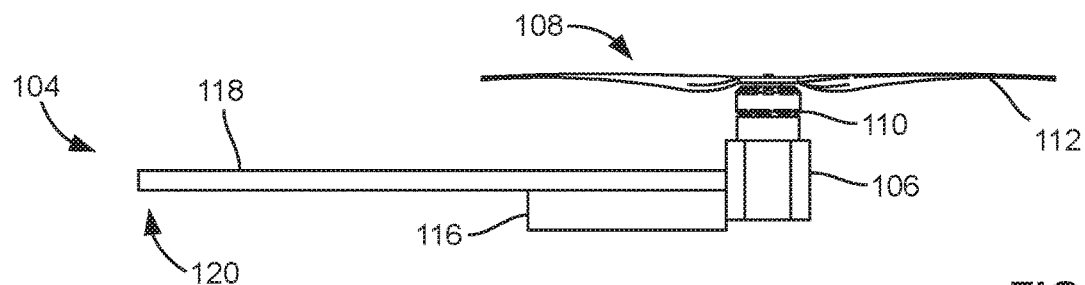

In one embodiment as shown in FIG. 12D, the battery assembly 116 of a rotor unit 104 extends horizontally backwardly from the base structure 106 towards the proximal end 120 of the rotor unit 104 and is coupled to the bottom of the supporting arm 118 using suitable fastening means such as screw, glue, welding, and/or the like.

FIGS. 13A to 13C show a configuration of the battery assembly 116 in an alternative embodiment. FIG. 13A is a side view of a rotor 104. FIG. 13B is a rear view of the rotor 104 viewing from a rear side as indicated by the arrow 128". FIG. 13C is a perspective view of the rotor 104. As shown, the battery assembly 116 in this embodiment extends horizontally backwardly from the base structure 106 towards the proximal end 120 of the rotor unit 104 and is coupled to a lateral side of the supporting arm 118 using suitable fastening means such as screw, glue, welding, and/or the like.

In one embodiment as shown in FIG. 14A, the battery assembly 116 of a rotor unit 104 comprises a plurality of battery units (also denoted as 116) extends horizontally backwardly from the base structure 106 towards the proximal end 120 of the rotor unit 104 and is coupled to the supporting arm 118 circumferentially thereabout using suitable fastening means such as screw, glue, welding, and/or the like.

Figure 14B:
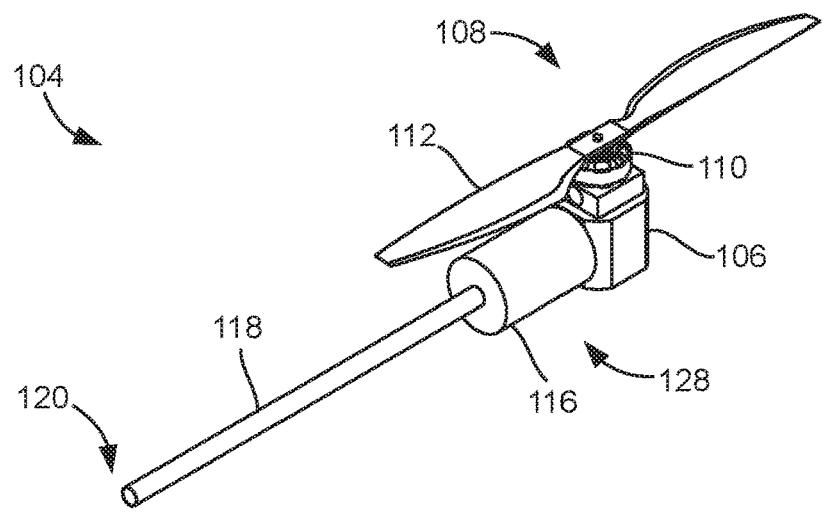

In one embodiment as shown in FIG. 14B, the battery assembly 116 comprises a longitudinal bore and extends horizontally backwardly from the base structure 106 towards the proximal end 120 of the rotor unit 104. The supporting arm 118 extends backwardly from the base structure 106 through the longitudinal bore of the battery assembly 116 and coupled to the center unit (not shown). In other words, the battery assembly 116 extends horizontally backwardly from the base structure and circumferentially about the supporting arm 118.

Figure 14C:
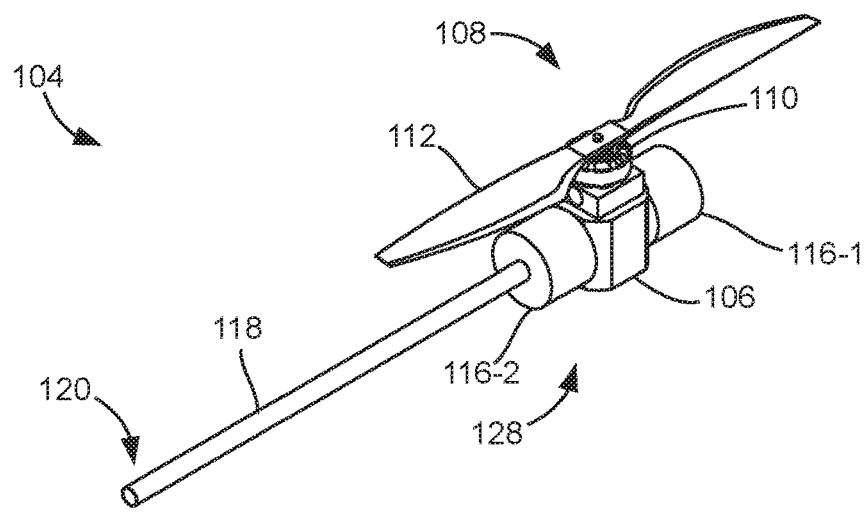

In one embodiment as shown in FIG. 14C, the battery assembly 116 comprises two battery units 116-1 and 116-2. The battery unit 116-1 extends horizontally forwardly from the base structure 106 away from the proximal end 120 of the rotor unit 104. The battery unit 116-2 comprises a longitudinal bore and extends horizontally backwardly from the base structure 106 towards the proximal end 120 of the rotor unit 104. The supporting arm 118 extends horizontally backwardly from the base structure 106 through the longitudinal bore of the battery assembly 116 and coupled to the center unit (not shown).

Figure 14D:
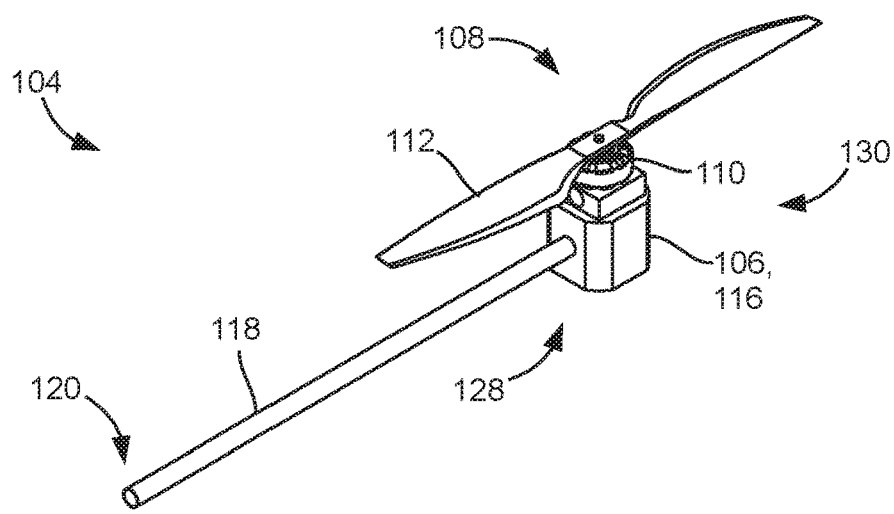

In one embodiment as shown in FIG. 14D, the battery assembly 116 may be received in or integrated with the base structure 106.

Figure 14E:
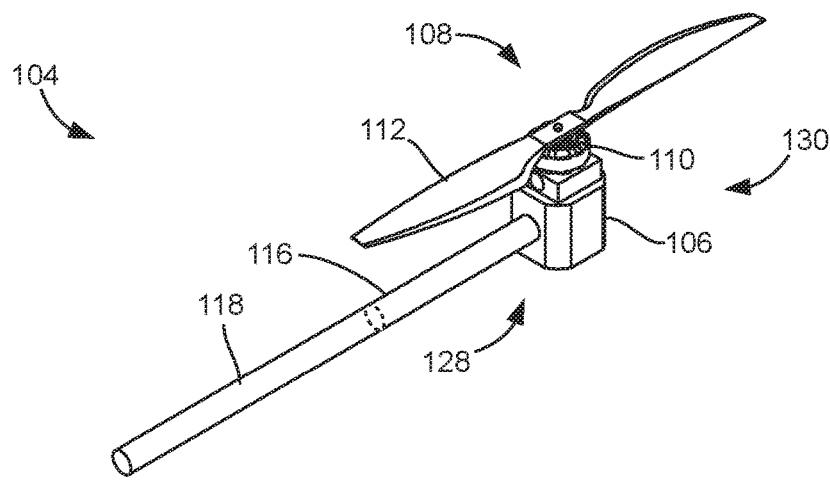

In one embodiment as shown in FIG. 14E, the battery assembly 116 may be received in or integrated with the supporting arm 118.

In above embodiments, each rotor unit 104 comprises a rotor assembly 108 configured as a puller with the blade 112 above the electrical motor 110. In some embodiments, at least some of the rotor units 104 comprises rotor assemblies 108 configured as pushers with their blades 112 below the corresponding electrical motors 110.

Figure 15A:
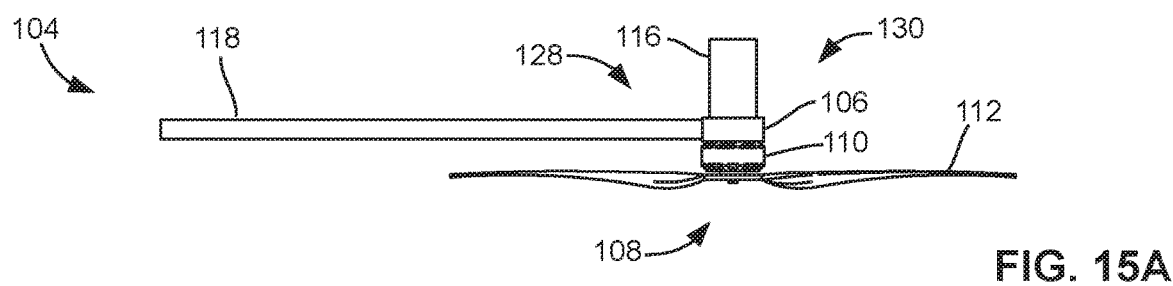
FIGS. 15A and 15B show various configurations of the battery assembly according to some alternative embodiments, wherein the rotor unit comprises a rotor assembly configured as a pusher with the blade below the electrical motor.

For example, in one embodiment as shown in FIG. 15A, the rotor assembly 108 is configured as a pusher and the battery assembly 116 extends upwardly from the base structure 106.

Figure 15B:
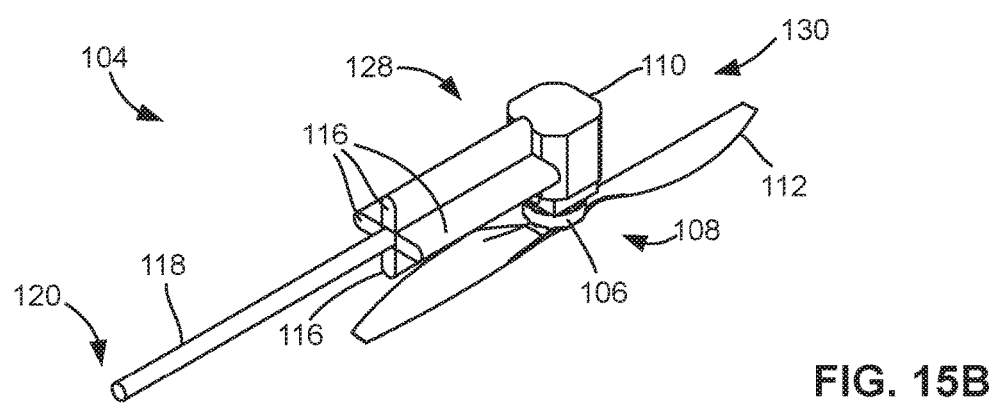

In one embodiment as shown in FIG. 15B, the rotor assembly 108 is configured as a pusher. The battery assembly 116 of a rotor unit 104 comprises a plurality of battery units extends backwardly from the base structure 106 towards the proximal end 120 of the rotor unit 104 and is coupled to the supporting arm 118 circumferentially thereabout using suitable fastening means such as screw, glue, welding, and/or the like.

Figure 16A:
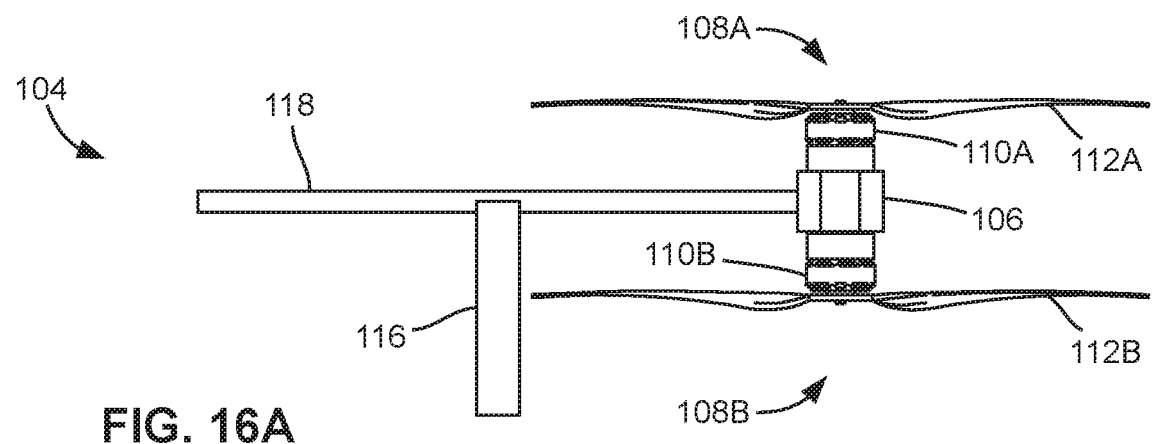
FIGS. 16A and 16B show various configurations of the battery assembly according to some alternative embodiments, wherein the rotor unit comprises two rotor assemblies with one rotor assembly configured as a puller with the blade above the electrical motor and the other rotor assembly configured as a pusher with the blade below the electrical motor.
Figure 16B:
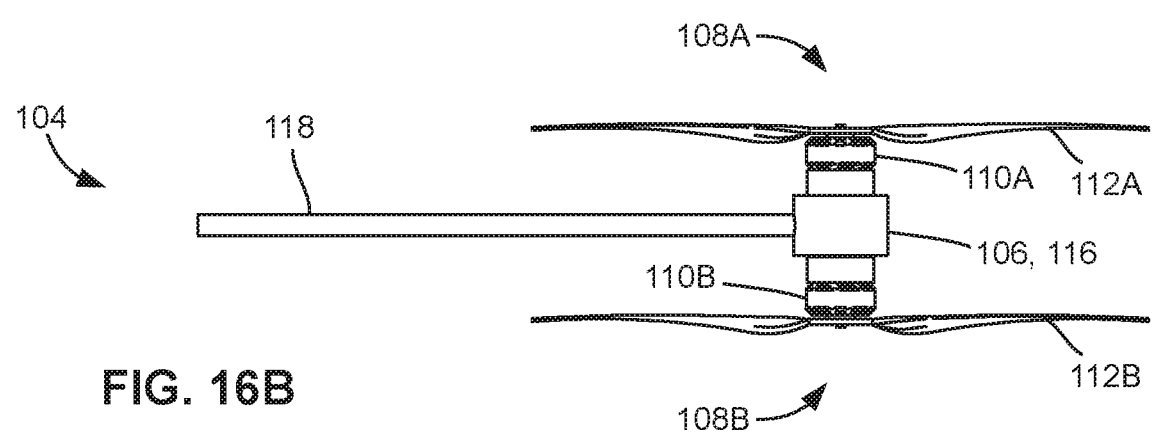

In some embodiments as shown in FIGS. 16A and 16B, one or more rotor units 104 may each comprise two rotor assemblies 108A and 108B with one rotor assembly 108A configured as a puller with the blade 112 above the electrical motor 110 and the other rotor assembly 108B configured as a pusher with the blade 112 below the electrical motor 110.

In the embodiment shown in FIG. 16A, the battery assembly 116 extends downwardly from the supporting arm 118 at a location spaced from or in proximity with the base structure 106 and the rotor assemblies 108A and 108B with a sufficient distance away from the center unit (not shown). In this embodiment, the battery assembly 116 is also configured for acting as a supporting leg.

In the embodiment shown in FIG. 16B, the battery assembly 116 may be received in or integrated with the base structure 106.

In an embodiment similar to that shown in FIG. 16B, the battery assembly 116 may be received in or integrated with the supporting arm 118.

Although in above embodiments, the UAV 100 comprises a power balancing board 306, in some alternative embodiments, the UAV 100 may not comprise a power balancing board 306. The disadvantage of these embodiments is that the battery assemblies 116 may be drained in different rates. As flight of the UAV 100 is usually over when at least one battery assembly is drained out, the flight time of the UAV 100 without power balancing may be shorter than that of the UAV 100 with power balancing.

In embodiments shown in FIGS. 1 to 5, the base structure 106 comprises a first engagement structure having two pairs of grooves 146 and 148. The battery assembly 116 comprises an engagable second engagement structure having two pairs of ridges 206 and 208 engagable with the two pairs of grooves 146 and 148 the base structure 106, respectively. In some alternative embodiments, the base structure 106 may only comprise one pair of grooves, and the battery assembly 116 may only comprise one pair of ridges engagable with the pair of grooves of the base structure 106, respectively.

In some alternative embodiments, the base structure 106 may comprise three or more pairs of grooves 146 and 148, and the battery assembly 116 comprises three or more pairs of ridges 206 and 208 engagable with the three or more pairs of grooves 146 and 148 of the base structure 106, respectively.

In some alternative embodiments, the base structure 106 may comprise two pairs of ridges, and the battery assembly 116 may comprise two pairs of grooves engagable with the two pairs of ridges of the base structure 106, respectively.

In some alternative embodiments, the base structure 106 may comprise another number of pairs of ridges, and the battery assembly 116 may comprise a corresponding number of grooves engagable with the ridges of the base structure 106, respectively.

In above embodiments, each rotor unit 104 is coupled to the center unit 102 via a coupling component 118. In some alternative embodiments, at least one of the rotor units 104 may have a suitable size and shape such that the rotor unit 104 may itself be a coupling component and is directly coupled to the center unit 102.

Figure 17:
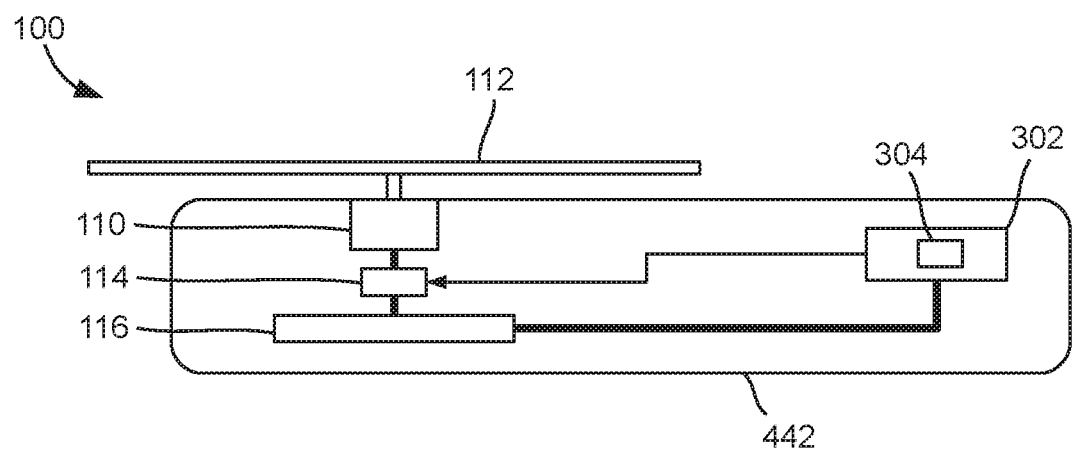
FIG. 17 is a schematic diagram of a UAV according to some alternative embodiments of this disclosure, wherein the UAV comprises one motor driving one propeller.

In some alternative embodiments as shown in FIG. 17, a UAV 100 comprises a body or housing 442 housing receiving therein a plurality of components. In particular, the housing 442 receives therein a motor 110, an ESC module 114, a battery assembly 116, a central controller 302, and other suitable components as described above (not shown). Similar to the embodiments described above, the motor 110, the ESC module 114, and the battery assembly 116 are arranged in proximity with each other, and the central controller 302 is spaced or at a distance from the battery assembly 116.

The motor 110 comprises a shaft extending out of the housing 442 and rotatably coupled to a propeller 112. The battery assembly 116 powers the motor 110 via the ESC module 114, and also powers the central controller 302 and components thereof.

The central controller 302 comprises a flight control module 304 which controls the ESC module 114 to adjust the speed of the motor 110 for controlling the flight of the UAV 100.

Figure 18:
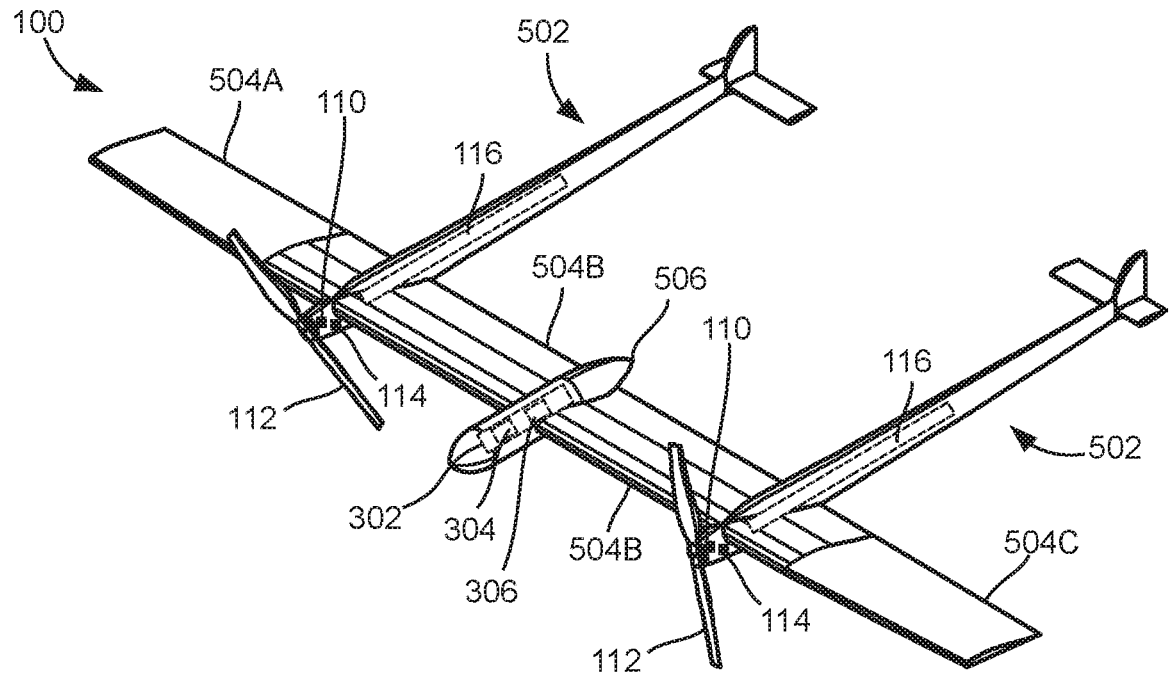
FIG. 18 is a schematic perspective view of a fixed-wing, twin-fuselage UAV according to some alternative embodiments of this disclosure, wherein each fuselage comprises a battery assembly.

In some alternative embodiments as shown in FIG. 18, the battery-powered aerial vehicle 100 is a fixed-wing, twin-fuselage UAV. The UAV 100 comprises a body formed by two fuselages 502 coupled by a connection section 504B in the form of a central wing section, and two side wing sections 504A and 504C extending outwardly from respective fuselages 502. The connection section 504B comprises an equipment housing 506.

Each fuselage 502 receives therein about a front end thereof a propelling module formed by a motor 110 and an ESC 114, and a battery assembly 116 arranged in proximity with the propelling module. The equipment housing 506 receives therein a central controller 302 having a flight control module 304 and a power balancing board 306, and other suitable components as described above (not shown). Thus, the central controller 302 is spaced from the battery assemblies 116.

Each motor 110 comprises a shaft extending out of the fuselage 502 and rotatably coupled to a propeller 112. The battery assemblies 116 power the motors 110 via the ESCs 114, and also power the central controller 302 and components thereof. The electrical interconnection of the components of the UAV 100 in these embodiments is similar to that described in FIGS. 1 to 7.

Figure 19:
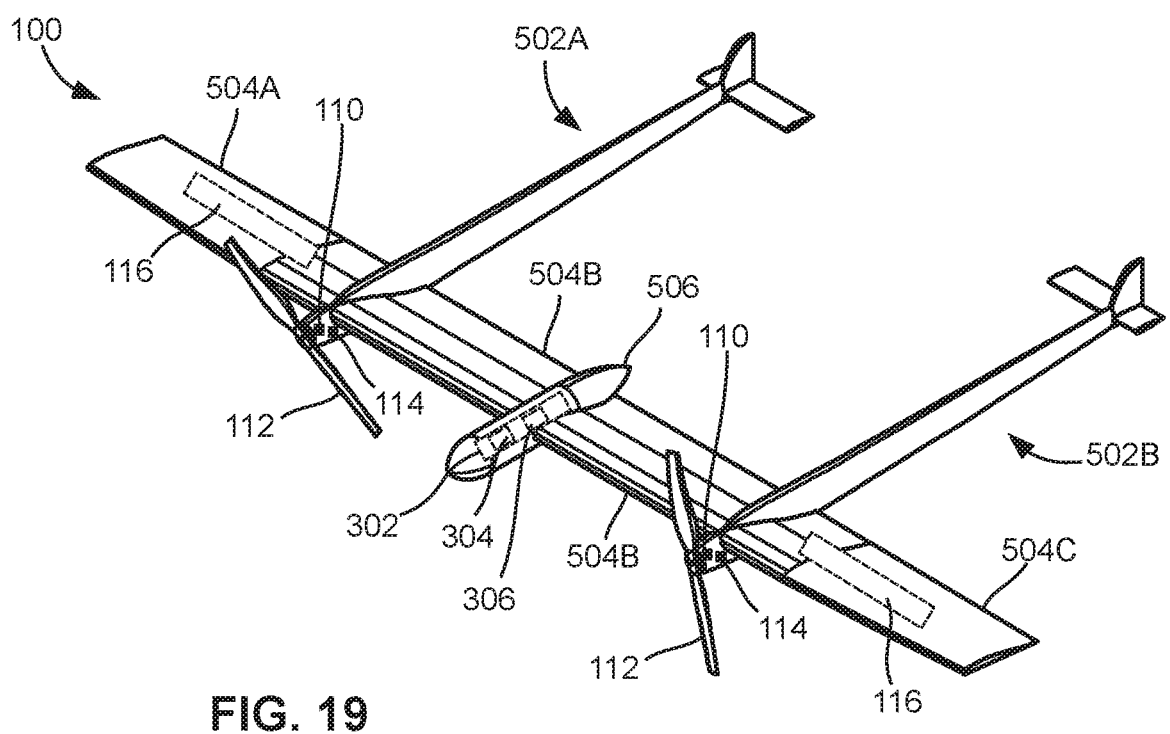
FIG. 19 is a schematic perspective view of a fixed-wing, twin-fuselage UAV according to some alternative embodiments of this disclosure, wherein each side section of the fixed wing comprises a battery assembly.

FIG. 19 shows a fixed-wing, twin-fuselage UAV 100 in some alternative embodiments. The UAV 100 in these embodiments is similar to that shown in FIG. 18, except that in these embodiments, the fuselages 502 do not comprise any battery assembly. Rather, each side wing section 504A, 504C comprises a battery assembly 116. Thus, the central controller 302 is spaced from the battery assemblies 116.

Figure 20:
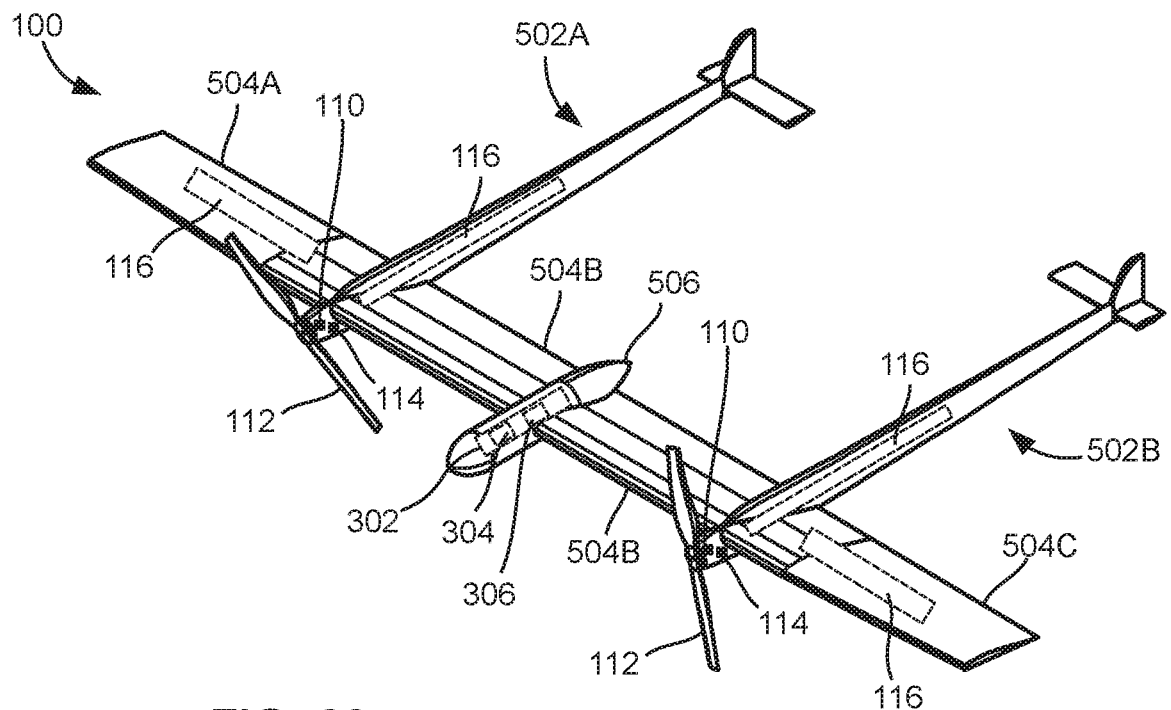
FIG. 20 is a schematic perspective view of a fixed-wing, twin-fuselage UAV comprising four battery assemblies, according to some alternative embodiments.

FIG. 20 shows a fixed-wing, twin-fuselage UAV 100 in some alternative embodiments. The UAV 100 in these embodiments is similar to that shown in FIG. 18, except that in these embodiments, each fuselage 502 comprises a battery assembly 116, and each side wing section 504A, 504C also comprises a battery assembly 116. Thus, the central controller 302 is spaced from the battery assemblies 116.

Figure 21:
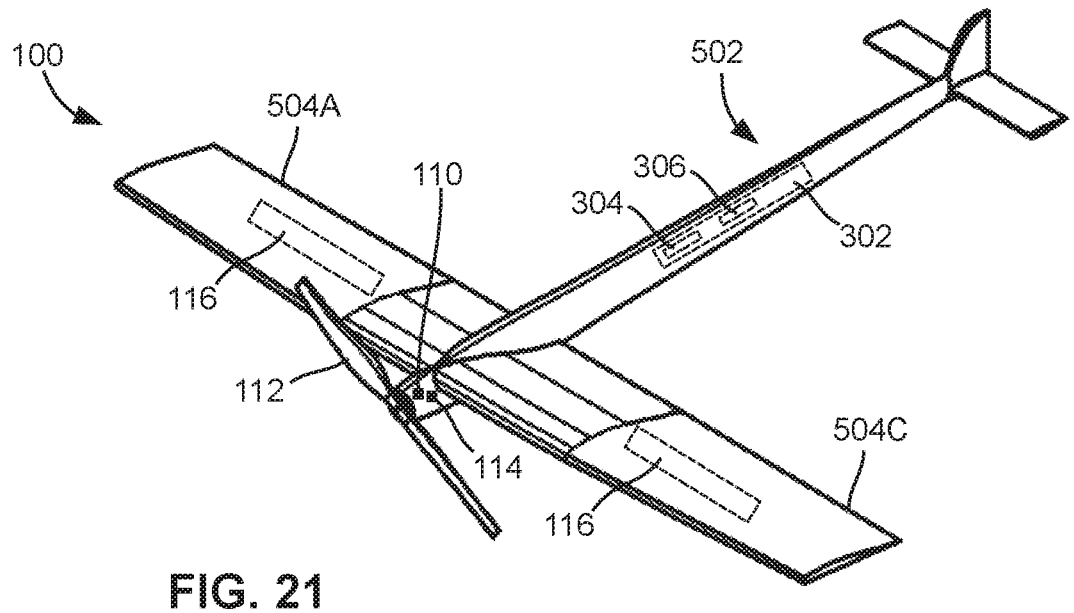
FIG. 21 is a schematic perspective view of a fixed-wing, single-fuselage UAV comprising two battery assemblies, according to some alternative embodiments.

In some alternative embodiments as shown in FIG. 21, the battery-powered aerial vehicle 100 is a fixed-wing, single-fuselage UAV. The UAV 100 comprises a body formed by a fuselage 502, and two wing sections 504A and 504C extended outwardly therefrom. The fuselage 502 receives therein about a front end thereof a propelling module formed by a motor 110 and an ESC 114. The motor 110 comprises a shaft extending forwardly out of the fuselage 502 and rotatably coupled to a propeller 112. The fuselage 502 also receives therein about a rear end thereof a central controller 302 having a flight controller 304 and a power balancing board 306, and other suitable components as described above (not shown).

Each of the wing sections 504A and 504C receives therein a battery assembly 116. Thus, the central controller 302 is spaced from the battery assemblies 116.

The battery assemblies 116 power the motors 110 via the ESCs 114, and also powers the central controller 302 and components thereof. The electrical interconnection of the components of the UAV 100 in these embodiments is similar to that described in FIGS. 1 to 7.

Figure 22:
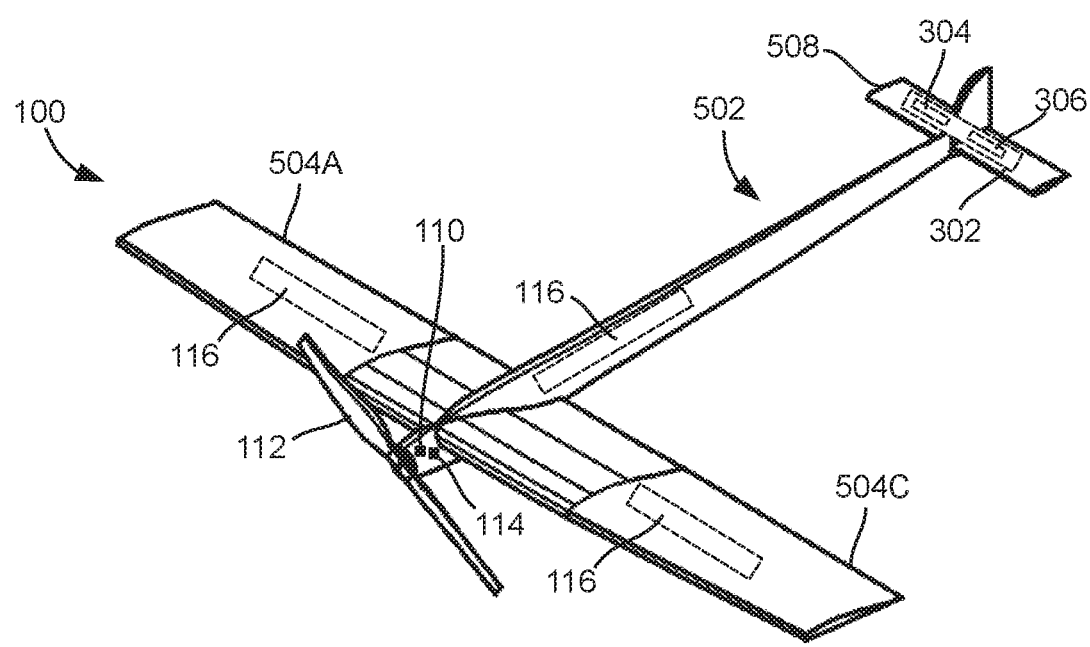
FIG. 22 is a schematic perspective view of a fixed-wing, single-fuselage UAV comprising three battery assemblies, according to some alternative embodiments.

FIG. 22 shows a fixed-wing, single-fuselage UAV 100 in some alternative embodiments. The UAV 100 in these embodiments is similar to that shown in FIG. 21. However, in these embodiments, the central controller 302 and the components thereof are located about the rear end of the fuselage 502 such as in the stabilizer 508. Moreover, the UAV 100 in these embodiments comprises three battery assemblies 116, with two battery assemblies 116 located in the left and right wing sections 504A and 504C, and the third battery assembly 116 located in the fuselage 502 about the front end thereof. Thus, the central controller 302 is spaced from the battery assemblies 116.

In above embodiments, each rotor assembly 108 is functionally coupled to and controlled by an ESC module 114. In some alternative embodiments, the battery-powered aerial vehicle 100 does not comprise any individual ESC modules 114. In these embodiments, the central controller 302 comprises necessary components and/or circuits implementing the functions of ESC modules 114 for controlling the speeds of the electrical motor 110.

In some embodiments, the battery-powered aerial vehicle 100 may comprise a cargo container for carrying and/or transporting goods and/or suitable objects.

In some embodiments, the battery-powered aerial vehicle 100 may comprise a cabin or cockpit for carrying one or more passengers. In these embodiments, the aerial vehicle 100 may comprise a safety system for protecting the safety of the passengers. The aerial vehicle 100 may be manually operated by one of the passengers as a pilot. Alternatively, the aerial vehicle 100 may be automatically or autonomously operated by a pilot program on the aerial vehicle 100 or remote thereto.

In above embodiments, the one or more battery assemblies are at a distance away from the central controller for reducing or eliminating electromagnetic interference to the central controller and the components thereof such as magnetometer. In addition to this advantage/benefit, Applicant has also identified other unexpected advantages/benefits.

As those skilled in the art would appreciate, weight is an important or even a critical factor of battery-powered aerial vehicles. By locating the one or more battery assemblies at a distance away from the central controller and in proximity with the propelling modules, the battery-powered aerial vehicles disclosed herein may achieve a weight reduction compared to traditional battery-powered aerial vehicles. Such a weight reduction may be achieved in (i) weight reduction in structural parts or components of the body of the battery-powered aerial vehicle, and/or (ii) weight reduction in employing shortened lengths of power wiring.

For example, in traditional multiple-axial battery-powered aerial vehicles, the central controller and battery are located in the center unit while the propelling modules are located in the rotor units. Moreover, the payload is typically located under the center unit. As the lifting forces are generated at the rotor units, consequently the structural parts of the body such as the supporting arms and the center unit (in particular the structural portion thereof that receives the supporting arms) are required to have a high strength for accommodating the combined weight of the center unit, which generally implies a high weight requirement to the supporting arms and the center unit.

On the other hand, by locating the one or more battery assemblies 116 at a distance away from the central controller 302 and in proximity with the propelling modules 105, the one or more battery assemblies 116 are located in the rotor units 104. As the weights of the one or more battery assemblies 116 are carried by the rotor units 104, the supporting arms 118 and the center unit 102 do not require a high strength as those of the traditional multiple-axial battery-powered aerial vehicles. The weight of the supporting arms 118 and the center unit 102 and in turn the weight of the entire battery-powered aerial vehicle 100 may be adequately reduced. Such a weight reduction gives rise to an increased battery weight/aircraft weight ratio.

The weight reduction of the battery-powered aerial vehicles 100 disclosed herein may also be achieved by using shortened lengths of power wiring.

For example, in multiple-axial battery-powered aerial vehicles, the propelling modules 105 receive power and control signals from the ESC module 114 and the ESC module 114 in turn receives power from the battery 116. Compared to the signal wires or cables only requiring small currents for transmitting control signals, power wires or cables generally require large currents and therefore are generally thicker (i.e., of larger gauges) and heavier.

In traditional multiple-axial battery-powered aerial vehicles, the central controller and batteries are located in the center unit, and the propelling modules are located in the rotor units. The ESC module(s) may be located in the center unit or in rotor units. Therefore, long power cables are required between the center unit and the rotor units for delivering electrical power from the battery at the center unit to the propelling modules at a plurality of rotor units regardless where the ESC module is located.

On the other hand, in some embodiments of the battery-powered aerial vehicles 100 disclosed herein, the central controller 302 is located at the center unit 102 and may have its own power source, and each rotor unit 104 comprises a battery assembly 116, ESC module 114, and propelling module 105 in proximity with each other, Therefore, the battery-powered aerial vehicles 100 does not require any power cables between the center unit 102 and the plurality of rotor units 104, thereby giving rise to weight reduction.

Although the battery-powered aerial vehicles 100 disclosed herein may require extended signal wires for transmitting control signals, and in some embodiments may require additional signal wires for power balancing such as active power balancing, the increased weight of signal wires may not offset the weight reduction from shortened power cables as the signal wires are generally of much lighter weight than power cables. The weight reduction from the shortened power cables may be more significant for large-size battery-powered aerial vehicles.

In some embodiments, passive power balancing is used wherein additional power cables may be used for extending from the battery assemblies 116 distributed in the rotor units 104 to a common connection point in the center unit 102. As the balancing current is generally much lower than the current required for powering the propelling modules 105 and ESC modules 114, the power cables for passive power balancing are of smaller gauges than the power cables for powering the propelling modules 105 and ESC modules 114. Moreover, each power balancing cable may comprise a less number of wires than the power cable, such as two smaller-gauge wires in each power balancing cable compared to three larger-gauge power wires in each power cable for powering propelling modules 105 and ESC modules 114. Therefore, the battery-powered aerial vehicles 100 disclosed herein may still achieve weight reduction when passive power balancing is used.

Another advantage of the battery-powered aerial vehicles 100 disclosed herein is that, by locating each battery assembly 116 in proximity with the corresponding ESC module 114 (see FIGS. 2B and 5), the wires between the battery assembly 116 and the ESC module 114 are shortened thereby reducing the risk of ESC failure.

Although embodiments have been described above with reference to the accompanying drawings, those of skill in the art will appreciate that variations and modifications may be made without departing from the scope thereof as defined by the appended claims.

What is claimed is:

1. A battery-powered aerial vehicle comprising
a body;
a central controller received in the body;
at least one propelling module received in the body and functionally coupled to the central controller, wherein each at least one propelling module comprises a base structure, an electrical motor coupled to the base structure, a propeller rotatably coupled to the electrical motor, and an electrical speed-controller coupled to the base structure and electrically coupled to the electrical motor for controlling a speed thereof; and one or more battery assemblies coupled to or received in the body;

wherein the one or more battery assemblies are configured for at least powering the at least one propelling module;

wherein the one or more battery assemblies and the at least one propelling module are at a distance away from the central controller for reducing electromagnetic interference to the central controller; and wherein at least one of the one or more battery assemblies extends from the propelling module in at least one of a downwardly direction or an upwardly direction.

2. The battery-powered aerial vehicle of claim 1, wherein at least one of the one or more battery assemblies comprises one or more metal-clad battery cells.

3. The battery-powered aerial vehicle of claim 1, wherein the central controller comprises a battery-power balancing circuit for balancing the power consumption rates of the one or more battery assemblies.

4. The battery-powered aerial vehicle of claim 1, wherein the base structure further comprises a chamber for receiving therein the electrical speed-controller.

5. The battery-powered aerial vehicle of claim 4, wherein the body comprises a center unit receiving therein the central controller, and a plurality of rotor units circumferentially uniformly distributed about and coupled to the center unit via a plurality of supporting arms; and wherein each of the at least one propelling module is received in one of the plurality of rotor units.

6. The battery-powered aerial vehicle of claim 5, wherein at least one of the one or more battery assemblies extends downwardly from the propelling module.

7. The battery-powered aerial vehicle of claim 6, wherein the battery assembly is further configured for acting as a supporting leg.

8. The battery-powered aerial vehicle of claim 5, wherein at least one of the one or more battery assemblies additionally extends horizontally from the propelling module towards the center unit.

9. The battery-powered aerial vehicle of claim 5, wherein the one or more battery assemblies are coupled to the base structure of the at least one propelling module.

10. The battery-powered aerial vehicle of claim 9, wherein the battery assembly comprises at an end thereof two pairs of ridges; and wherein the base structure comprises:

two pairs of grooves for receiving therein the two pairs of ridges for coupling the battery assembly to the base structure.

11. The battery-powered aerial vehicle of claim 9, wherein the electrical speed-controller comprises first, second, and third sets of electrical terminals; wherein the first set of electrical terminals are configured for contacting a fourth set of electrical terminals of the battery assembly for receiving power therefrom, the second set of electrical terminals are configured for contacting a fifth set of electrical terminals of the base structure that electrically coupled to the electrical motor for powering the electrical motor and communicating therewith, and the third set of electrical terminals are configured for contacting a sixth set of electrical terminals of the base structure that electrically coupled to the central controller for communicating with the central controller.

12. A propelling module for coupling to a center unit of a battery-powered aerial vehicle at a distance away from the center unit via a support arm for reducing electromagnetic interference to the central controller, said center unit comprising a central controller, the propelling module comprising:

a propeller;

an electrical motor coupled to and driving the propeller;

an electrical speed-controller electrically coupled to the motor for controlling the speed thereof; and a battery assembly for powering at least the motor and the electrical speed-controller;

wherein at least one of the one or more battery assemblies extends from the propelling module in at least one of a downwardly direction or an upwardly direction.

13. The propelling module of claim 12, further comprising a base structure receiving therein the electrical speed-controller and coupled to the battery assembly and the electrical motor, the base structure being configured for coupling to the central controller of the center unit.

14. The propelling module of claim 13, further comprising a coupling component for coupling the base structure to the central controller of the center unit.

15. A method of assembling a battery-powered aerial vehicle, the method comprising:

preparing a center unit having a central controller;

preparing a plurality of rotor units each having a propeller, an electrical motor coupled to and driving the propeller, and an electrical speed-controller electrically coupled to the electrical motor for controlling a speed thereof;

physically and electrically coupling a battery assembly to each rotor unit for powering at least the electrical motor and the electrical speed-controller thereof; and physically and electrically coupling each rotor unit to the center unit at a distance away from the center unit via a supporting arm for reducing electromagnetic interference to the central controller;

wherein at least one of the one or more battery assemblies extends from the rotor unit in at least one of a downwardly direction or an upwardly direction.

16. The method of claim 15, wherein the preparing the plurality of rotor units comprises:

for each rotor unit, preparing a base structure having a first mounting surface, a second mounting surface, a chamber, and a first engagement structure on a third mounting surface;

coupling an electrical motor assembly onto the first mounting surface of the base structure, the electrical motor assembly comprising an electrical motor coupled to a propeller;

receiving an electrical speed-controller in the chamber of the base structure;

preparing a battery assembly having a second engagement structure engagable with the first engagement structure; and engaging the first and second engagement structures to couple the battery assembly to the base structure.

17. The method of claim 16, wherein the first engagement structure comprises at least two pairs of grooves, and the second engagement structure comprises at least two pairs of ridges; and wherein the engaging the first and second engagement structures comprises engaging the at least two pairs of grooves with the at least two pairs of ridges, respectively.

18. The method of claim 15, wherein the physically and electrically coupling each rotor unit to the center unit comprises:

coupling a first end of the supporting arm to the second mounting surface of the base structure of the rotor unit; and coupling a second end of the supporting arm to the center unit.

* * * * *